US012658998B2

(12) United States Patent
Ibrahim et al.

(10) Patent No.: US 12,658,998 B2
(45) Date of Patent: Jun. 16, 2026

(54) LINKED CHANNEL STATE INFORMATION REFERENCE SIGNAL RESOURCES FOR SUB-BAND FULL DUPLEX

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 18/361,798

(22) Filed: Jul. 28, 2023

(65) Prior Publication Data

US 2025/0038806 A1    Jan. 30, 2025

(51) Int. Cl.
*H04B 7/06*    (2006.01)
*H04L 5/00*    (2006.01)
*H04L 5/14*    (2006.01)

(52) U.S. Cl.
CPC ......... *H04B 7/0626* (2013.01); *H04L 5/0051* (2013.01); *H04L 5/0057* (2013.01); *H04L 5/14* (2013.01)

(58) Field of Classification Search
CPC ... H04B 7/0626; H04L 5/0051; H04L 5/0057; H04L 5/14
See application file for complete search history.

(56) References Cited

U.S. PATENT DOCUMENTS

| | | | | |
|---|---|---|---|---|
| 2023/0328656 A1* | 10/2023 | Rudolf | ............... | H04W 52/143 |
| 2023/0361844 A1* | 11/2023 | Li | ........................... | H04B 7/043 |
| 2023/0421222 A1* | 12/2023 | Chatterjee | ............ | H04B 7/0626 |
| 2024/0015546 A1* | 1/2024 | Awadin | .................. | H04W 24/10 |
| 2024/0114374 A1* | 4/2024 | Chege | ................... | H04W 24/10 |

OTHER PUBLICATIONS

International Search Report and Written Opinion—PCT/US2024/034461—ISA/EPO—Sep. 24, 2024.

(Continued)

*Primary Examiner* — Derrick V Rose
(74) *Attorney, Agent, or Firm* — Harrity & Harrity, LLP

(57)    ABSTRACT
Various aspects of the present disclosure generally relate to wireless communication. In some aspects, a user equipment (UE) may receive a channel state information (CSI) resource configuration indicating a linked pair of CSI reference signal (CSI-RS) resources for sub-band full duplex (SBFD) symbols, the linked pair of CSI-RS resources including a first CSI-RS resource on a first downlink sub-band and a second CSI-RS resource on a second downlink sub-band. The UE may receive a first CSI-RS in the first CSI-RS resource on the first downlink sub-band and a second CSI-RS in the second CSI-RS resource on the second downlink sub-band. The UE may transmit a CSI report including at least one CSI metric associated with measurements of the first CSI-RS and the second CSI-RS. Numerous other aspects are described.

29 Claims, 16 Drawing Sheets

(56)    References Cited

OTHER PUBLICATIONS

Kim Y (Samsung) et al: "SBFD Feasibility and Design Consider-ations for NR Duplex Evolution", 3GPP TSG-RAN WG1 Meeting #112, R1-2301262, vol. 3GPP RAN 1, No. Athens, GR, Feb. 27, 2023-Mar. 3, 2023, Feb. 17, 2023, XP052248397, 35 pages, Sections 1-6.

Kumagai S (NTT Docomo Inc)., et al., "Discussion on Subband Non-Overlapping Full Duplex", 3GPP TSG RAN WG1 #112bis-e, R1-2303711, vol. 3GPP RAN 1, No. Online, Apr. 17, 2023-Apr. 26, 2023, Apr. 7, 2023, XP052294269, 14 pages, Sections 1-3.

Qualcomm Incorporated: "Feasibility and Techniques for Subband Non-Overlapping Full Duplex", 3GPP TSG RAN WG1, Meeting #110, R1-2207231, 3rd Generation Partnership Project, Mobile Competence Centre, 650, Route Des Lucioles, F-06921 Sophia-Antipolis Cedex, France, vol. RAN WG1, No. Toulouse, Aug. 22, 2022-Aug. 26, 2022, Aug. 13, 2022, XP052275167, 28 pages, Sections 1-5.

* cited by examiner

600

630

CSI-resourceConfig

CSI-RS resource set 1

CSI-RS resource 1

CSI-RS resource 2

Secondary_flag = 1
Primary resource ID = 1

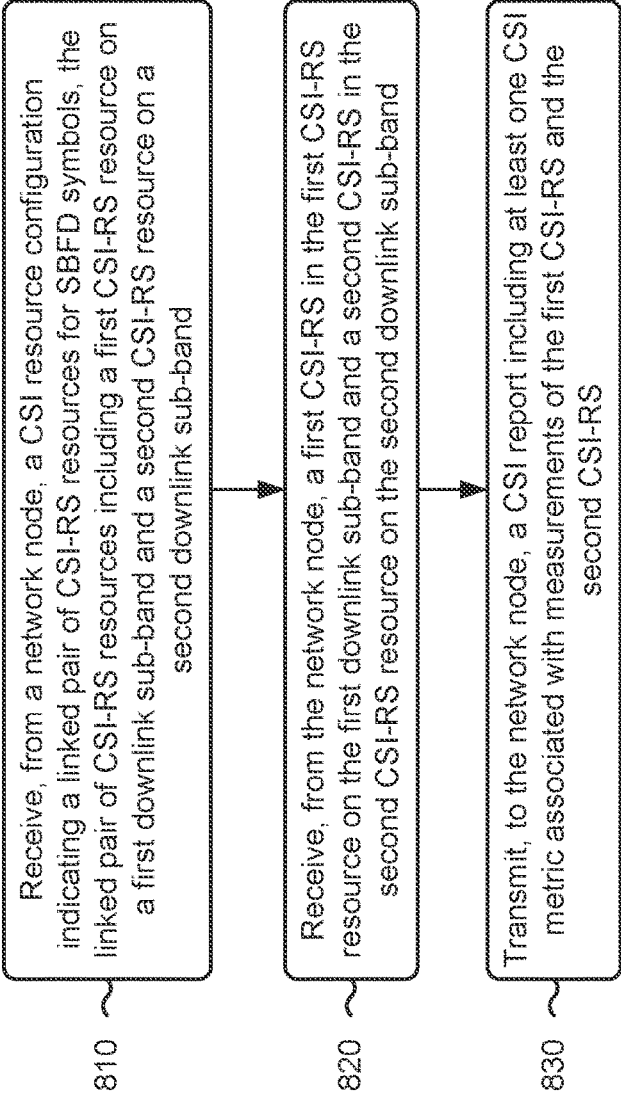

810 Receive, from a network node, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band 820 Receive, from the network node, a first CSI-RS in the first CSI-RS resource on the first downlink sub-band and a second CSI-RS in the second CSI-RS resource on the second downlink sub-band 830 Transmit, to the network node, a CSI report including at least one CSI metric associated with measurements of the first CSI-RS and the second CSI-RS

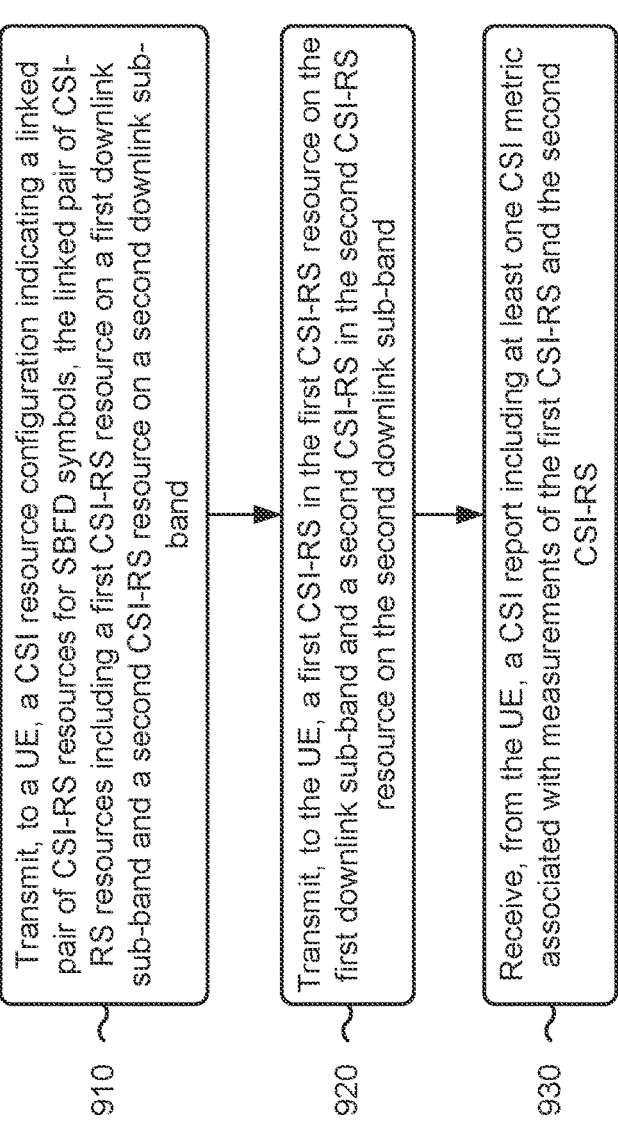

Transmit, to a UE, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band Transmit, to the UE, a first CSI-RS in the first CSI-RS resource on the first downlink sub-band and a second CSI-RS in the second CSI-RS resource on the second downlink sub-band Receive, from the UE, a CSI report including at least one CSI metric associated with measurements of the first CSI-RS and the second CSI-RS

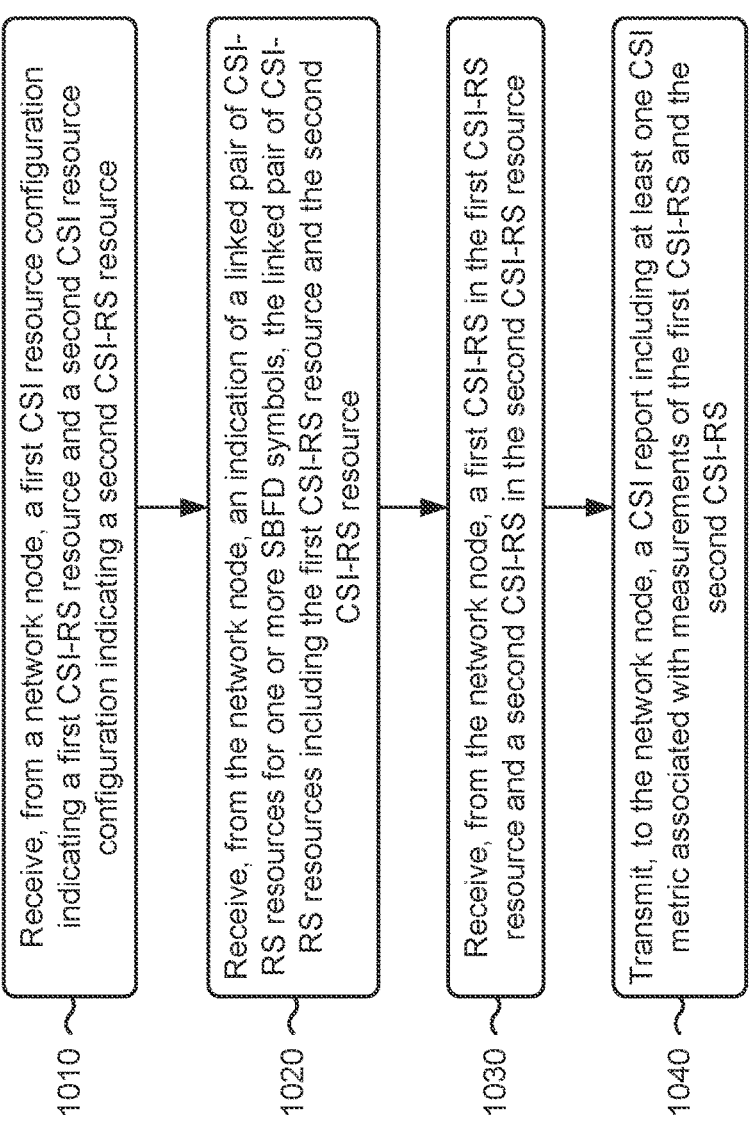

1010 — Receive, from a network node, a first CSI resource configuration indicating a first CSI-RS resource and a second CSI resource configuration indicating a second CSI-RS resource 1020 — Receive, from the network node, an indication of a linked pair of CSI-RS resources for one or more SBFD symbols, the linked pair of CSI-RS resources including the first CSI-RS resource and the second CSI-RS resource 1030 — Receive, from the network node, a first CSI-RS in the first CSI-RS resource and a second CSI-RS in the second CSI-RS resource 1040 — Transmit, to the network node, a CSI report including at least one CSI metric associated with measurements of the first CSI-RS and the second CSI-RS

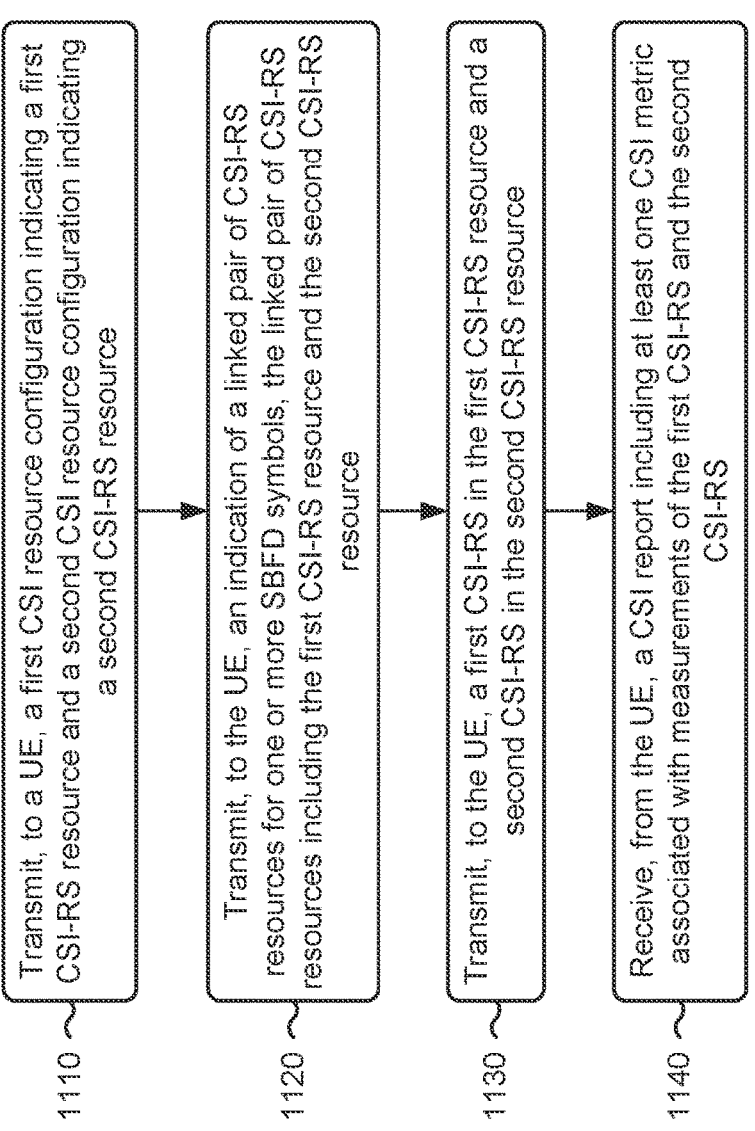

1110 Transmit, to a UE, a first CSI resource configuration indicating a first CSI-RS resource and a second CSI resource configuration indicating a second CSI-RS resource 1120 Transmit, to the UE, an indication of a linked pair of CSI-RS resources for one or more SBFD symbols, the linked pair of CSI-RS resources including the first CSI-RS resource and the second CSI-RS resource 1130 Transmit, to the UE, a first CSI-RS in the first CSI-RS resource and a second CSI-RS in the second CSI-RS resource 1140 Receive, from the UE, a CSI report including at least one CSI metric associated with measurements of the first CSI-RS and the second CSI-RS

LINKED CHANNEL STATE INFORMATION REFERENCE SIGNAL RESOURCES FOR SUB-BAND FULL DUPLEX

FIELD OF THE DISCLOSURE

Aspects of the present disclosure generally relate to wireless communication and specifically, to techniques and apparatuses for linked channel state information reference signal resources for sub-band full duplex.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

A wireless communication system may support full duplex (FD) communication. "FD communication" refers to simultaneous bi-directional communication between devices in a wireless network. In sub-band full duplex (SBFD) communication, downlink and uplink communications may be transmitted at the same time, but on different frequency sub-bands. For example, a downlink sub-band used for downlink communication may be separated from an uplink sub-band used for uplink communication, in the frequency domain, by a guard band. In some examples, SBFD communications may use two downlink sub-bands separated by an uplink sub-band and guard bands.

In some examples, a user equipment (UE) may perform channel estimation for a downlink channel based on or otherwise associated with a measurement of a channel state information (CSI) reference signal (CSI-RS). The UE may report, to a network node, one or more channel estimation parameters in a CSI report. The network node may use the CSI report to select transmission parameters for downlink communications to the UE. However, when SBFD communication is enabled with multiple downlink sub-bands, it may be difficult to allocate CSI-RS resources for downlink channel estimation due to a separation between the downlink sub-bands.

SUMMARY

Some aspects described herein relate to an apparatus for wireless communication at a user equipment (UE). The apparatus may include one or more memories storing processor-executable code and one or more processors coupled with the one or more memories. At least one processor of the one or more processors may be configured to cause the UE to receive, from a network node, a channel state information (CSI) resource configuration indicating a linked pair of CSI reference signal (CSI-RS) resources for sub-band full duplex (SBFD) symbols, the linked pair of CSI-RS resources including a first CSI-RS resource on a first downlink sub-band and a second CSI-RS resource on a second downlink sub-band. At least one processor of the one or more processors may be configured to cause the UE to receive, from the network node, a first CSI-RS in the first CSI-RS resource on the first downlink sub-band and a second CSI-RS in the second CSI-RS resource on the second downlink sub-band. At least one processor of the one or more processors may be configured to cause the UE to transmit, to the network node, a CSI report including at least one CSI metric associated with measurements of the first CSI-RS and the second CSI-RS.

Some aspects described herein relate to an apparatus for wireless communication at a network node. The apparatus may include one or more memories storing processor-executable code and one or more processors coupled with the one or more memories. At least one processor of the one or more processors may be configured to cause the network node to transmit, to a UE, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band. At least one processor of the one or more processors may be configured to cause the network node to transmit, to the UE, a first CSI-RS in the first CSI-RS resource on the first downlink sub-band and a second CSI-RS in the second CSI-RS resource on the second downlink sub-band. At least one processor of the one or more processors may be configured to cause the network node to receive, from the UE, a CSI report including at least one CSI metric associated with measurements of the first CSI-RS and the second CSI-RS.

Some aspects described herein relate to an apparatus for wireless communication at a UE. The apparatus may include one or more memories storing processor-executable code and one or more processors coupled with the one or more memories. At least one processor of the one or more processors may be configured to cause the UE to receive, from a network node, a first CSI resource configuration indicating a first CSI-RS resource and a second CSI resource configuration indicating a second CSI-RS resource. At least one processor of the one or more processors may be configured to cause the UE to receive, from the network node, an indication of a linked pair of CSI-RS resources for one or more SBFD symbols, the linked pair of CSI-RS resources including the first CSI-RS resource and the second CSI-RS resource. At least one processor of the one or more processors may be configured to cause the UE to receive, from the network node, a first CSI-RS in the first CSI-RS resource and a second CSI-RS in the second CSI-RS resource. At least one processor of the one or more processors may be configured to cause the UE to transmit, to the network node, a CSI report including at least one CSI metric associated with measurements of the first CSI-RS and the second CSI-RS.

Some aspects described herein relate to an apparatus for wireless communication at a network node. The apparatus may include one or more memories storing processor-executable code and one or more processors coupled with the one or more memories. At least one processor of the one or more processors may be configured to cause the network node to transmit, to a UE, a first CSI resource configuration indicating a first CSI-RS resource and a second CSI resource configuration indicating a second CSI-RS resource. At least one processor of the one or more processors may be configured to cause the network node to transmit, to the UE, an indication of a linked pair of CSI-RS resources for one or more SBFD symbols, the linked pair of CSI-RS resources including the first CSI-RS resource and the second CSI-RS resource. At least one processor of the one or more processors may be configured to cause the network node to transmit, to the UE, a first CSI-RS in the first CSI-RS resource and a second CSI-RS in the second CSI-RS resource. At least one processor of the one or more processors may be configured to cause the network node to receive, from the UE, a CSI report including at least one CSI metric associated with measurements of the first CSI-RS and the second CSI-RS.

Some aspects described herein relate to a method of wireless communication performed at a UE. The method may include receiving, from a network node, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band. The method may include receiving, from the network node, a first CSI-RS in the first CSI-RS resource on the first downlink sub-band and a second CSI-RS in the second CSI-RS resource on the second downlink sub-band. The method may include transmitting, to the network node, a CSI report including at least one CSI metric associated with measurements of the first CSI-RS and the second CSI-RS.

Some aspects described herein relate to a method of wireless communication performed at a network node. The method may include transmitting, to a UE, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band. The method may include transmitting, to the UE, a first CSI-RS in the first CSI-RS resource on the first downlink sub-band and a second CSI-RS in the second CSI-RS resource on the second downlink sub-band. The method may include receiving, from the UE, a CSI report including at least one CSI metric associated with measurements of the first CSI-RS and the second CSI-RS.

Some aspects described herein relate to a method of wireless communication performed at a UE. The method may include receiving, from a network node, a first CSI resource configuration indicating a first CSI-RS resource and a second CSI resource configuration indicating a second CSI-RS resource. The method may include receiving, from the network node, an indication of a linked pair of CSI-RS resources for one or more SBFD symbols, the linked pair of CSI-RS resources including the first CSI-RS resource and the second CSI-RS resource. The method may include receiving, from the network node, a first CSI-RS in the first CSI-RS resource and a second CSI-RS in the second CSI-RS resource. The method may include transmitting, to the network node, a CSI report including at least one CSI metric associated with measurements of the first CSI-RS and the second CSI-RS.

Some aspects described herein relate to a method of wireless communication performed at a network node. The method may include transmitting, to a UE, a first CSI resource configuration indicating a first CSI-RS resource and a second CSI resource configuration indicating a second CSI-RS resource. The method may include transmitting, to the UE, an indication of a linked pair of CSI-RS resources for one or more SBFD symbols, the linked pair of CSI-RS resources including the first CSI-RS resource and the second CSI-RS resource. The method may include transmitting, to the UE, a first CSI-RS in the first CSI-RS resource and a second CSI-RS in the second CSI-RS resource. The method may include receiving, from the UE, a CSI report including at least one CSI metric associated with measurements of the first CSI-RS and the second CSI-RS.

Some aspects described herein relate to a non-transitory computer-readable medium that stores a set of instructions for wireless communication by a UE. The set of instructions, when executed by one or more processors of the UE, may cause the UE to receive, from a network node, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band. The set of instructions, when executed by one or more processors of the UE, may cause the UE to receive, from the network node, a first CSI-RS in the first CSI-RS resource on the first downlink sub-band and a second CSI-RS in the second CSI-RS resource on the second downlink sub-band. The set of instructions, when executed by one or more processors of the UE, may cause the UE to transmit, to the network node, a CSI report including at least one CSI metric associated with measurements of the first CSI-RS and the second CSI-RS.

Some aspects described herein relate to a non-transitory computer-readable medium that stores a set of instructions for wireless communication by a network node. The set of instructions, when executed by one or more processors of the network node, may cause the network node to transmit, to a UE, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band. The set of instructions, when executed by one or more processors of the network node, may cause the network node to transmit, to the UE, a first CSI-RS in the first CSI-RS resource on the first downlink sub-band and a second CSI-RS in the second CSI-RS resource on the second downlink sub-band. The set of instructions, when executed by one or more processors of the network node, may cause the network node to receive, from the UE, a CSI report including at least one CSI metric associated with measurements of the first CSI-RS and the second CSI-RS.

Some aspects described herein relate to a non-transitory computer-readable medium that stores a set of instructions for wireless communication by a UE. The set of instructions, when executed by one or more processors of the UE, may cause the UE to receive, from a network node, a first CSI resource configuration indicating a first CSI-RS resource and a second CSI resource configuration indicating a second CSI-RS resource. The set of instructions, when executed by one or more processors of the UE, may cause the UE to receive, from the network node, an indication of a linked pair of CSI-RS resources for one or more SBFD symbols, the linked pair of CSI-RS resources including the first CSI-RS resource and the second CSI-RS resource. The set of instructions, when executed by one or more processors of the UE, may cause the UE to receive, from the network node, a first CSI-RS in the first CSI-RS resource and a second CSI-RS in the second CSI-RS resource. The set of instructions, when executed by one or more processors of the UE, may cause the UE to transmit, to the network node, a CSI report including at least one CSI metric associated with measurements of the first CSI-RS and the second CSI-RS.

Some aspects described herein relate to a non-transitory computer-readable medium that stores a set of instructions for wireless communication by a network node. The set of instructions, when executed by one or more processors of the network node, may cause the network node to transmit, to a UE, a first CSI resource configuration indicating a first CSI-RS resource and a second CSI resource configuration indicating a second CSI-RS resource. The set of instructions, when executed by one or more processors of the network node, may cause the network node to transmit, to the UE, an indication of a linked pair of CSI-RS resources for one or more SBFD symbols, the linked pair of CSI-RS resources including the first CSI-RS resource and the second CSI-RS resource. The set of instructions, when executed by one or more processors of the network node, may cause the network node to transmit, to the UE, a first CSI-RS in the first CSI-RS resource and a second CSI-RS in the second CSI-RS resource. The set of instructions, when executed by one or more processors of the network node, may cause the network node to receive, from the UE, a CSI report including at least one CSI metric associated with measurements of the first CSI-RS and the second CSI-RS.

Some aspects described herein relate to an apparatus for wireless communication. The apparatus may include means for receiving, from a network node, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band. The apparatus may include means for receiving, from the network node, a first CSI-RS in the first CSI-RS resource on the first downlink sub-band and a second CSI-RS in the second CSI-RS resource on the second downlink sub-band. The apparatus may include means for transmitting, to the network node, a CSI report including at least one CSI metric associated with measurements of the first CSI-RS and the second CSI-RS.

Some aspects described herein relate to an apparatus for wireless communication. The apparatus may include means for transmitting, to a UE, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band. The apparatus may include means for transmitting, to the UE, a first CSI-RS in the first CSI-RS resource on the first downlink sub-band and a second CSI-RS in the second CSI-RS resource on the second downlink sub-band. The apparatus may include means for receiving, from the UE, a CSI report including at least one CSI metric associated with measurements of the first CSI-RS and the second CSI-RS.

Some aspects described herein relate to an apparatus for wireless communication. The apparatus may include means for receiving, from a network node, a first CSI resource configuration indicating a first CSI-RS resource and a second CSI resource configuration indicating a second CSI-RS resource. The apparatus may include means for receiving, from the network node, an indication of a linked pair of CSI-RS resources for one or more SBFD symbols, the linked pair of CSI-RS resources including the first CSI-RS resource and the second CSI-RS resource. The apparatus may include means for receiving, from the network node, a first CSI-RS in the first CSI-RS resource and a second CSI-RS in the second CSI-RS resource. The apparatus may include means for transmitting, to the network node, a CSI report including at least one CSI metric associated with measurements of the first CSI-RS and the second CSI-RS.

Some aspects described herein relate to an apparatus for wireless communication. The apparatus may include means for transmitting, to a UE, a first CSI resource configuration indicating a first CSI-RS resource and a second CSI resource configuration indicating a second CSI-RS resource. The apparatus may include means for transmitting, to the UE, an indication of a linked pair of CSI-RS resources for one or more SBFD symbols, the linked pair of CSI-RS resources including the first CSI-RS resource and the second CSI-RS resource. The apparatus may include means for transmitting, to the UE, a first CSI-RS in the first CSI-RS resource and a second CSI-RS in the second CSI-RS resource. The apparatus may include means for receiving, from the UE, a CSI report including at least one CSI metric associated with measurements of the first CSI-RS and the second CSI-RS.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 8 is a flowchart illustrating an example process performed, for example, by a UE that supports linked SCI-RS resources for SBFD in accordance with the present disclosure.

FIG. 9 is a flowchart illustrating an example process performed, for example, by a network node that supports linked CSI-RS resources for SBFD in accordance with the present disclosure.

FIG. 10 is a flowchart illustrating an example process performed, for example, by a UE that supports linked CSI-RS resources for SBFD in accordance with the present disclosure.

FIG. 11 is a flowchart illustrating an example process performed, for example, by a network node that supports linked CSI-RS resources for SBFD in accordance with the present disclosure.

DETAILED DESCRIPTION

Figure 1:
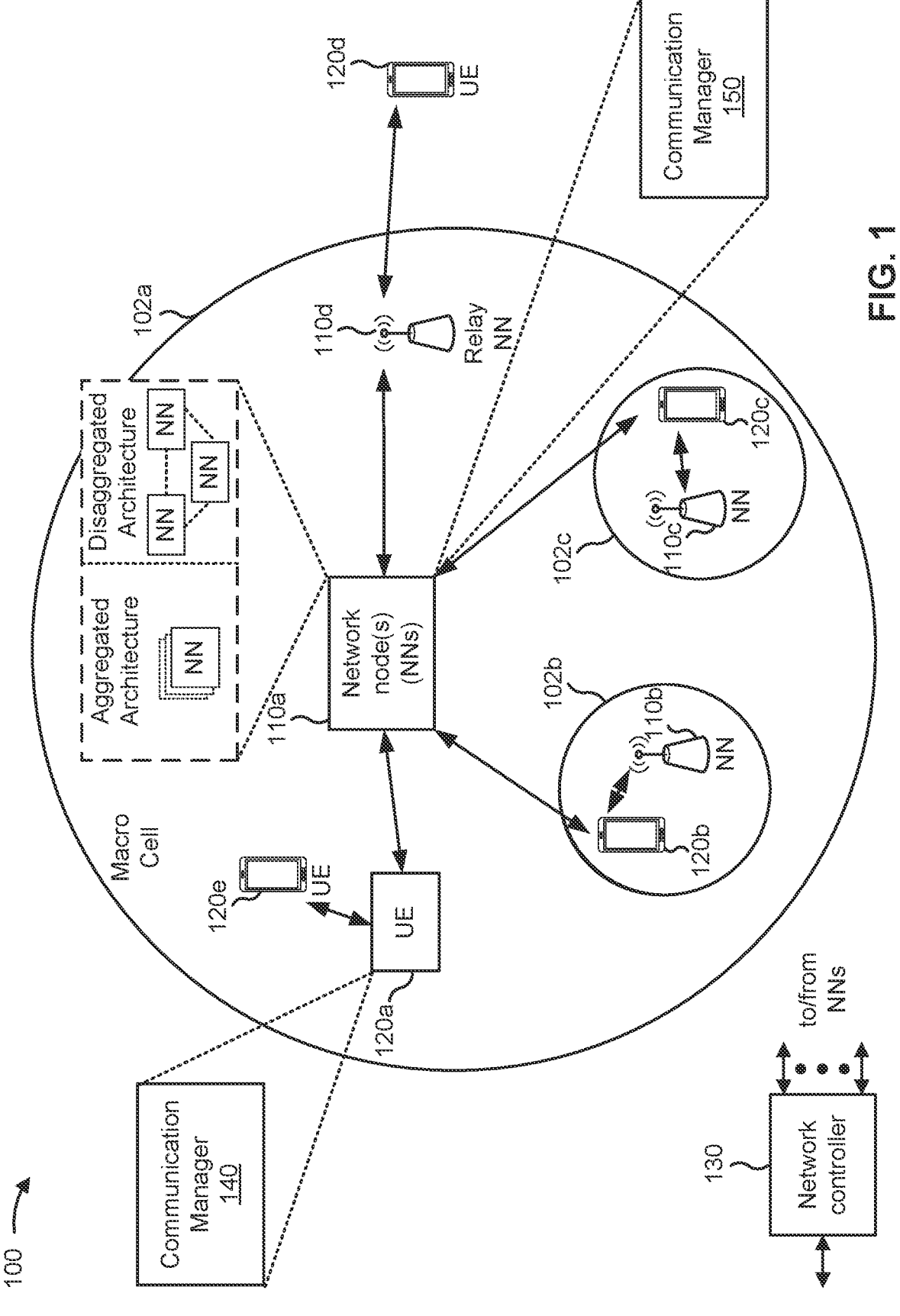
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Full duplex (FD) communication refers to simultaneous bi-directional communication between devices in a wireless network. In sub-band full duplex (SBFD) communication, downlink and uplink communications may be transmitted at the same time, but on different frequency sub-bands. In some examples, SBFD slots and/or symbols may be configured with multiple downlink sub-bands separated by an uplink sub-band and guard bands. In some examples, a user equipment (UE) may perform channel estimation for a downlink channel based on or otherwise associated with a measurement of a channel state information (CSI) reference signal (CSI-RS). The UE may report, to a network node, one or more channel estimation parameters in a CSI report. The network node may use the CSI report to select transmission parameters for downlink communications to the UE. In some examples, it may be difficult to allocate CSI-RS resources for downlink channel estimation across multiple downlink sub-bands in an SBFD slot or symbol due to a separation in the frequency domain between the downlink sub-bands. For example, downlink channel estimation based on or otherwise associated with a CSI-RS transmitted in a CSI-RS resource allocated in a single downlink sub-band may not accurately reflect channel conditions across two downlink sub-bands separated by an uplink sub-band and guard bands, and a CSI-RS resource allocated across both downlink sub-bands includes frequencies of the uplink sub-band and the guard bands.

In some aspects, a UE may be configured with a linked pair of CSI-RS resources for SBFD. The linked pair of CSI-RS resources may include CSI-RS resources on different downlink sub-bands. "Linked pair of CSI-RS resources" or "linked CSI-RS resources" refers to CSI-RS resources for which measurements of the corresponding CSI-RSs are used together to determine at least one CSI metric reported in a CSI report. A linked pair of CSI-RS resources in different downlink sub-bands may result in a CSI report that more accurately reflects the downlink channel conditions across both downlink sub-bands. However, there is currently no signaling mechanism for configuring a UE with a linked pair of CSI-RS resources for SBFD.

Various aspects relate generally to linked CSI-RS resources for SBFD symbols. Some aspects more specifically relate to signaling for configuring and enabling linked CSI-RS resources for SBFD symbols. In some aspects, a UE may receive, from a network node, a CSI resource configuration that indicates a linked pair of CSI-RS resources for SBFD symbols. The linked pair of CSI-RS resources may include a first CSI-RS resource on a first downlink sub-band and a second CSI-RS resource on a second downlink sub-band. The UE may receive a first CSI-RS in the first CSI-RS resource and a second CSI-RS in the second CSI-RS resource, and the UE may transmit, to the network node, a CSI report including at least one CSI metric associated with measurements of the first CSI-RS and the second CSI-RS. In some examples, the linked pair of CSI-RS resources may be indicated in different CSI resource sets of the CSI resource configuration. For example, the CSI resource configuration may indicate a first CSI-RS resource set including the first CSI-RS resource and a second CSI-RS resource set including the second CSI-RS resource. In some examples, the linked pair of CSI-RS resources may be indicated in a same CSI-RS resource set of the CSI resource configuration. In some examples in which the linked pair of CSI-RS resources are indicated in the same CSI-RS resource set of the CSI resource configuration, the CSI-RS resource set may include a linked pairing indication that indicates the linked pair of CSI-RS resources. In some other examples in which the linked pair of CSI-RS resources are indicated in the same CSI-RS resource set of the CSI resource configuration, the CSI-RS resource set may including an indication of a primary CSI-RS resource (e.g., the first CSI-RS resource) associated with the CSI-report and an indication of a secondary CSI-RS resource (e.g., the second CSI-RS resource) linked to the primary CSI-RS resource. In some examples, the CSI resource configuration may indicate a plurality of linked pairs of CSI-RS resources including the linked pair of CSI-RS resources, and the linked pair of CSI-RS resources may be activated from among the plurality of linked pairs of CSI-RS resources by a medium access control (MAC) control element (MAC-CE) received at the UE.

In some aspects, a UE may receive, from a network node, multiple CSI resource configurations indicating respective CSI-RS resources. The UE may receive, from the network node, an indication of a linked pair of CSI-RS resources of the CSI-RS resources indicated by the CSI resource configurations. The linked pair of CSI-RS resources may include a first CSI-RS resource on a first downlink sub-band and a second CSI-RS resource on a second downlink sub-band. The UE may receive a first CSI-RS in the first CSI-RS resource and a second CSI-RS in the second CSI-RS resource, and the UE may transmit, to the network node, a CSI report including at least one CSI metric associated with measurements of the first CSI-RS and the second CSI-RS. In some examples, the indication of the linked pair of CSI-RS resources may be included in a CSI report configuration. In some examples, the indication of the linked pair of CSI-RS resources may be included in layer 1 (L1) signaling associated with triggering aperiodic CSI-RS measurements or layer 2 (L2) signaling associated with activating semi-persistent CSI-RS resources.

In some examples, the linked pair of CSI-RS resources may be associated with the same symbols or the same slot location, the same CSI-RS port configuration, the same scrambling identifier, the same power offset, and/or the same resource block density. In some examples, the linked pair of CSI-RS resources may be configured on different downlink sub-bands that do not overlap in the frequency domain. In some examples, a dropping rule may specify UE behavior when a CSI-RS in a CSI-RS resource of the linked pair of CSI-RS resources is dropped. For example, in accordance with the dropping rule, the UE may skip a measurement of a second CSI-RS in the second CSI-RS resource in connection with a first CSI-RS in the first CSI-RS resource being dropped, or the UE may perform a measurement of the second CSI-RS in the second CSI-RS resource in connection with the first CSI-RS in the first CSI-RS resource being dropped. In some examples, the linked pair of CSI-RS resources may be associated with different symbols or different slots, and a timing requirement associated with the CSI report may be defined relative to a later-occurring one of the linked pair of CSI-RS resources. Additionally or alternatively, CSI processing units may be allocated from a time of an occurrence of the later-occurring one of the linked pair of CSI-RS resources. In some example, the linked pair of CSI-RS resources may be associated with different slots, and a CSI reference resource associated with the CSI report may apply to both of the linked pair of CSI-RS resources.

Particular aspects of the subject matter described in this disclosure can be implemented to realize one or more of the following potential advantages. In some examples, the described techniques can be used to enable allocation of linked CSI-RS resources for SBFD symbols. By enabling allocation of linked CSI-RS resources for SBFD symbols, the described techniques can be used to increase accuracy of downlink channel estimation across the downlink sub-bands in SBFD symbols. In some examples, the linked pair of CSI-RS resources for SBFD symbols may be indicated in the CSI resource configuration. For example, the CSI resource configuration may indicate the linked pair of CSI-RS resources in separate CSI-RS resource sets or in the same CSI-RS resource set. By indicating the linked pair of CSI-RS resources in the CSI resource configuration, signaling overhead for indicating the linked pair of CSI-RS resources for SBFD symbols may be reduced as compared with dynamically indicating linked pairs of CSI-RS resources for CSI measurements in SBFD symbols. In some examples, by indicating a plurality of linked pairs of CSI-RS resources in the CSI resource configuration and activating a linked pair of CSI-RS resources from among the plurality of linked pairs of CSI-RS resources MAC-CE received at the UE, the linked pair of CSI-RS resources can be updated, which increases flexibility of the selection of linked pair of CSI-RS resources to be measured for SBFD symbols.

In some examples, a CSI report configuration may include an indication of the linked pair of CSI-RS resources for SBFD symbols. By indicating the linked pair of CSI-RS resources for SBFD symbols in the CSI report configuration, different CSI reports can be associated with measurements of different linked pairs of CSI-RS resources for SBFD symbols, resulting in increased flexibility for reporting CSI measurements for SBFD symbols as compared with specifying the linked pair of CSI-RS resources in the CSI resource configuration. In some examples, the indication of the linked pair of CSI-RS resources may be included in L1 signaling associated with triggering aperiodic CSI-RS measurements or L2 signaling associated with activating semi-persistent CSI-RS resources. By indicating the linked pair of CSI-RS resources in L1 signaling associated with triggering aperiodic CSI-RS measurements or L2 signaling associated with activating semi-persistent CSI-RS resources, flexibility for selecting the linked pair of CSI-RS resources for aperiodic or semi-persistent measurements in SBFD symbols may be increased.

In some examples, by restricting the linked pair of CSI-RS resources for SBFD symbols to be associated with the same symbols or the same slot location, the same CSI-RS port configuration, the same scrambling identifier, the same power offset, the same resource block density, and/or different downlink sub-bands that do not overlap in the frequency domain, signaling overhead for configuring the linked pair of CSI-RS resources may be reduced and/or confusion between the UE and the network node regarding the allocation of the linked pair of CSI-RS resources and the measurements to be performed on the linked pair of CSI-RS resources may be reduced. In some examples, by the UE skipping or performing a measurement of a CSI-RS on one CSI-RS resource of the linked pair of CSI-RS resources when the CSI-RS on the other CSI-RS resource of the linked pair of CSI-RS resources is dropped in accordance with a dropping rule, confusion between the UE and the network node may be reduced and/or network resource and UE power consumption may be reduced (e.g., in connection with the UE skipping the measurement). In some examples, the linked pair of CSI-RS resources may be associated with different slots or different symbols. In such examples, by defining the timing requirement associated with the CSI report and/or CSI processing unit occupation relative to the later-occurring one of the linked pair of CSI-RS resources, and/or by applying the CSI reference resource to both of the linked pair of CSI-RS resources, sufficient time and processing resources may be allocated for the UE to perform measurements on the linked pair of CSI-RS resources and generate the CSI report, resulting in increased accuracy of the at least one CSI metric included in the CSI report.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a UE 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c.

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHZ-7.125 GHZ) and FR2 (24.25 GHz-52.6 GHz). Although a portion of FR1 is greater than 6 GHZ, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FRI or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above examples in mind, unless specifically stated otherwise, the term "sub-6 GHZ," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a network node, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band; receive, from the network node, a first CSI-RS in the first CSI-RS resource on the first downlink sub-band and a second CSI-RS in the second CSI-RS resource on the second downlink sub-band; and transmit, to the network node, a CSI report including at least one CSI metric associated with measurements of the first CSI-RS and the second CSI-RS. Additionally or alternatively, as described in more detail elsewhere herein, the communication manager 140 may receive, from a network node, a first CSI resource configuration indicating a first CSI-RS resource and a second CSI resource configuration indicating a second CSI-RS resource; receive, from the network node, an indication of a linked pair of CSI-RS resources for one or more SBFD symbols, the linked pair of CSI-RS resources including the first CSI-RS resource and the second CSI-RS resource; receive, from the network node, a first CSI-RS in the first CSI-RS resource and a second CSI-RS in the second CSI-RS resource; and transmit, to the network node, a CSI report including at least one CSI metric associated with measurements of the first CSI-RS and the second CSI-RS. Additionally or alternatively, the communication manager 140 may perform one or more other operations described herein.

In some aspects, the network node 110 may include a communication manager 150. As described in more detail elsewhere herein, the communication manager 150 may transmit, to a UE, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band; transmit, to the UE, a first CSI-RS in the first CSI-RS resource on the first downlink sub-band and a second CSI-RS in the second CSI-RS resource on the second downlink sub-band; and receive, from the UE, a CSI report including at least one CSI metric associated with measurements of the first CSI-RS and the second CSI-RS. Additionally or alternatively, as described in more detail elsewhere herein, the communication manager 150 may transmit, to a UE, a first CSI resource configuration indicating a first CSI-RS resource and a second CSI resource configuration indicating a second CSI-RS resource; transmit, to the UE, an indication of a linked pair of CSI-RS resources for one or more SBFD symbols, the linked pair of CSI-RS resources including the first CSI-RS resource and the second CSI-RS resource; transmit, to the UE, a first CSI-RS in the first CSI-RS resource and a second CSI-RS in the second CSI-RS resource; and receive, from the UE, a CSI report including at least one CSI metric associated with measurements of the first CSI-RS and the second CSI-RS. Additionally, or alternatively, the communication manager 150 may perform one or more other operations described herein.

Figure 2:
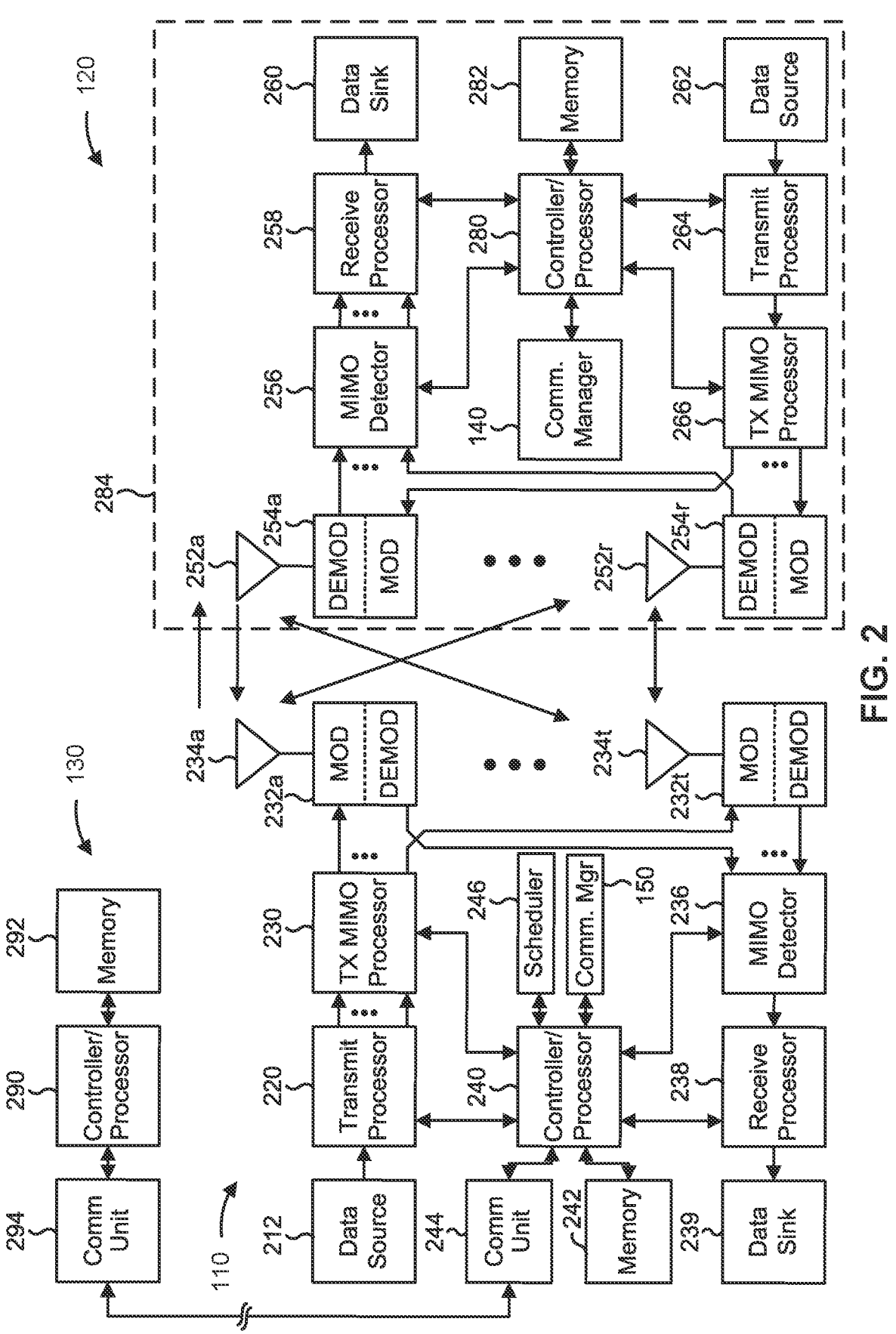
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine an RSRP parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP. RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with linked CSI-RS resources for SBFD, as described in more detail elsewhere herein. For example, the controller/processor 240 of the network node 110, the controller/processor 280 of the UE 120, or any other component(s) of FIG. 2 may perform or direct operations of, for example, process 800 of FIG. 8, process 900 of FIG. 9, process 1000 of FIG. 10, process 1100 of FIG. 11, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 800 of FIG. 8, process 900 of FIG. 9, process 1000 of FIG. 10, process 1100 of FIG. 11, or other processes as described herein. In some examples, executing instructions may include running the instructions, converting the instructions, compiling the instructions, or interpreting the instructions, among other examples. In some implementations, one or more of the multiple memories may be configured to store processor-executable code that, when executed, may configure the one or more processors to perform various functions described herein (as part of a processing system). In some other implementations, the processing system may be pre-configured to perform various functions described herein.

In some aspects, a UE (e.g., the UE 120) includes means for receiving, from a network node, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band; means for receiving, from the network node, a first CSI-RS in the first CSI-RS resource on the first downlink sub-band and a second CSI-RS in the second CSI-RS resource on the second downlink sub-band; and/or means for transmitting, to the network node, a CSI report including at least one CSI metric associated with measurements of the first CSI-RS and the second CSI-RS.

In some aspects, a UE (e.g., the UE 120) includes means for receiving, from a network node, a CSI resource configuration indicating a first CSI-RS resource and a second CSI resource configuration indicating a second CSI-RS resource; means for receiving, from the network node, an indication of a linked pair of CSI-RS resources for one or more SBFD symbols, the linked pair of CSI-RS resources including the first CSI-RS resource and the second CSI-RS resource; means for receiving, from the network node, a first CSI-RS in the first CSI-RS resource and a second CSI-RS in the second CSI-RS resource; and/or means for transmitting, to the network node, a CSI report including at least one CSI metric associated with measurements of the first CSI-RS and the second CSI-RS. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting, to a UE, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band; means for transmitting, to the UE, a first CSI-RS in the first CSI-RS resource on the first downlink sub-band and a second CSI-RS in the second CSI-RS resource on the second downlink sub-band; and/or means for receiving, from the UE, a CSI report including at least one CSI metric associated with measurements of the first CSI-RS and the second CSI-RS.

In some aspects, a network node (e.g., the network node 110) includes means for transmitting, to a UE, a first CSI resource configuration indicating a first CSI-RS resource and a second CSI resource configuration indicating a second CSI-RS resource; means for transmitting, to the UE, an indication of a linked pair of CSI-RS resources for one or more SBFD symbols, the linked pair of CSI-RS resources including the first CSI-RS resource and the second CSI-RS resource; means for transmitting, to the UE, a first CSI-RS in the first CSI-RS resource and a second CSI-RS in the second CSI-RS resource; and/or means for receiving, from the UE, a CSI report including at least one CSI metric associated with measurements of the first CSI-RS and the second CSI-RS. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

Figure 3B:
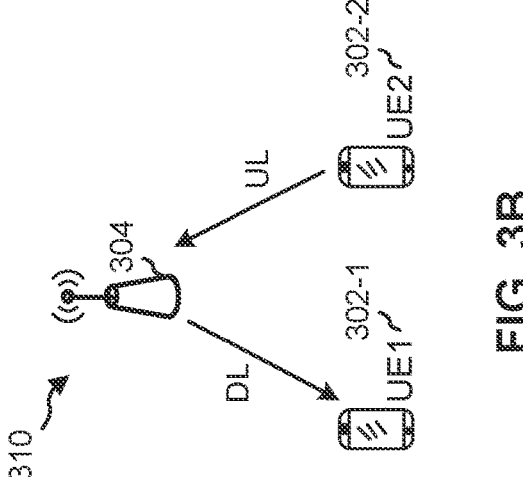
FIGS. 3A-3C are diagrams illustrating examples of full duplex (FD) communication in accordance with the present disclosure.
Figure 3C:
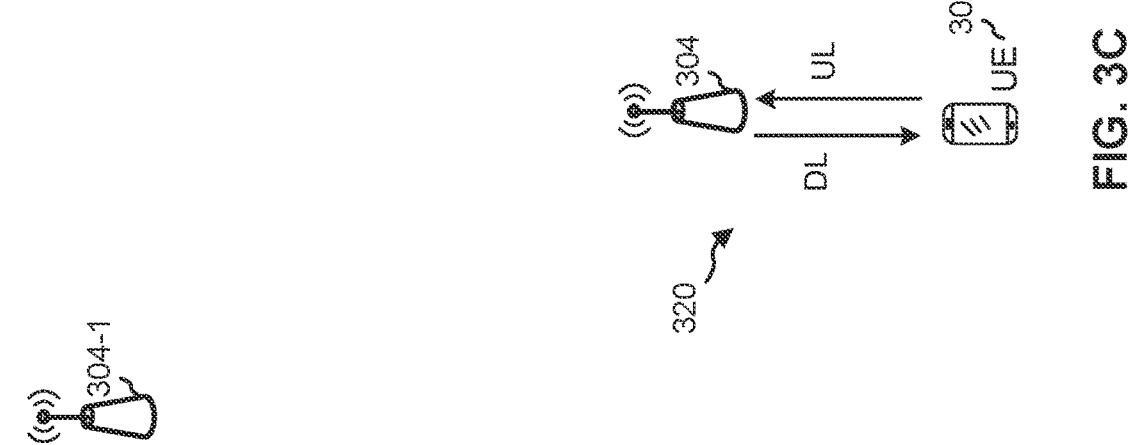
Figure 3A:
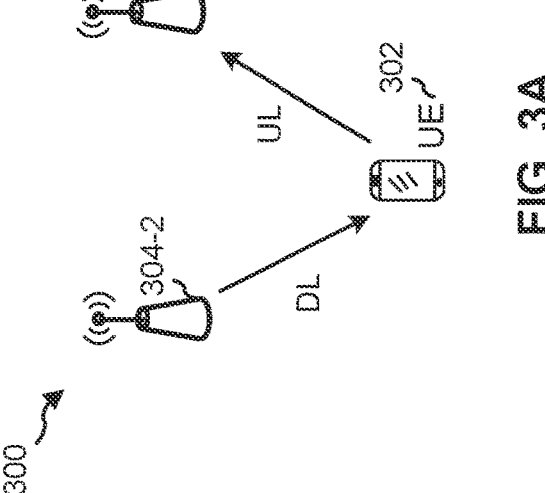

FIGS. 3A-3C are diagrams illustrating examples 300, 310, 320 of FD communication in accordance with the present disclosure. "Full duplex communication" (or "FD communication") in a wireless network refers to simultaneous bi-directional communication between devices in the wireless network. For example, a UE operating in an FD mode may transmit an uplink communication and receive a downlink communication at the same time (for example, in the same slot or the same symbol). A network node operating in an FD mode may transmit a downlink communication and receive an uplink communication at the same time (for example, in the same slot or the same symbol). "Half-duplex (HD) communication" in a wireless network refers to unidirectional communications (for example, only downlink communication or only uplink communication) between devices at a given time (for example, in a given slot or a given symbol).

The example 300 of FIG. 3A includes a UE 302 and two network nodes (for example, TRPs) 304-1, 304-2, where the UE 302 is sending uplink (UL) transmissions to the network node 304-1 and is receiving downlink (DL) transmissions from the network node 304-2. In the example 300 of FIG. 3A, FD is enabled for the UE1 302, but not for the network nodes 304-1, 304-2. The example 310 of FIG. 3B includes two UEs, shown as UE1 302-1 and UE2 302-2, and a network node 304, where the UE1 302-1 is receiving a DL transmission from the network node 304 and the UE2 302-2 is transmitting an UL transmission to the network node 304. In the example 310 of FIG. 3B, FD is enabled for the network node 304, but not for the UE1 302-1 and the UE2 302-2. The example 320 of FIG. 3C includes a UE 302 and a network node 304, where the UE 302 is receiving a DL transmission from the network node 304 and the UE 302 is transmitting an UL transmission to the network node 304. In the example 320 of FIG. 3C, FD is enabled for both the UE 302 and the network node 304.

Figure 4:
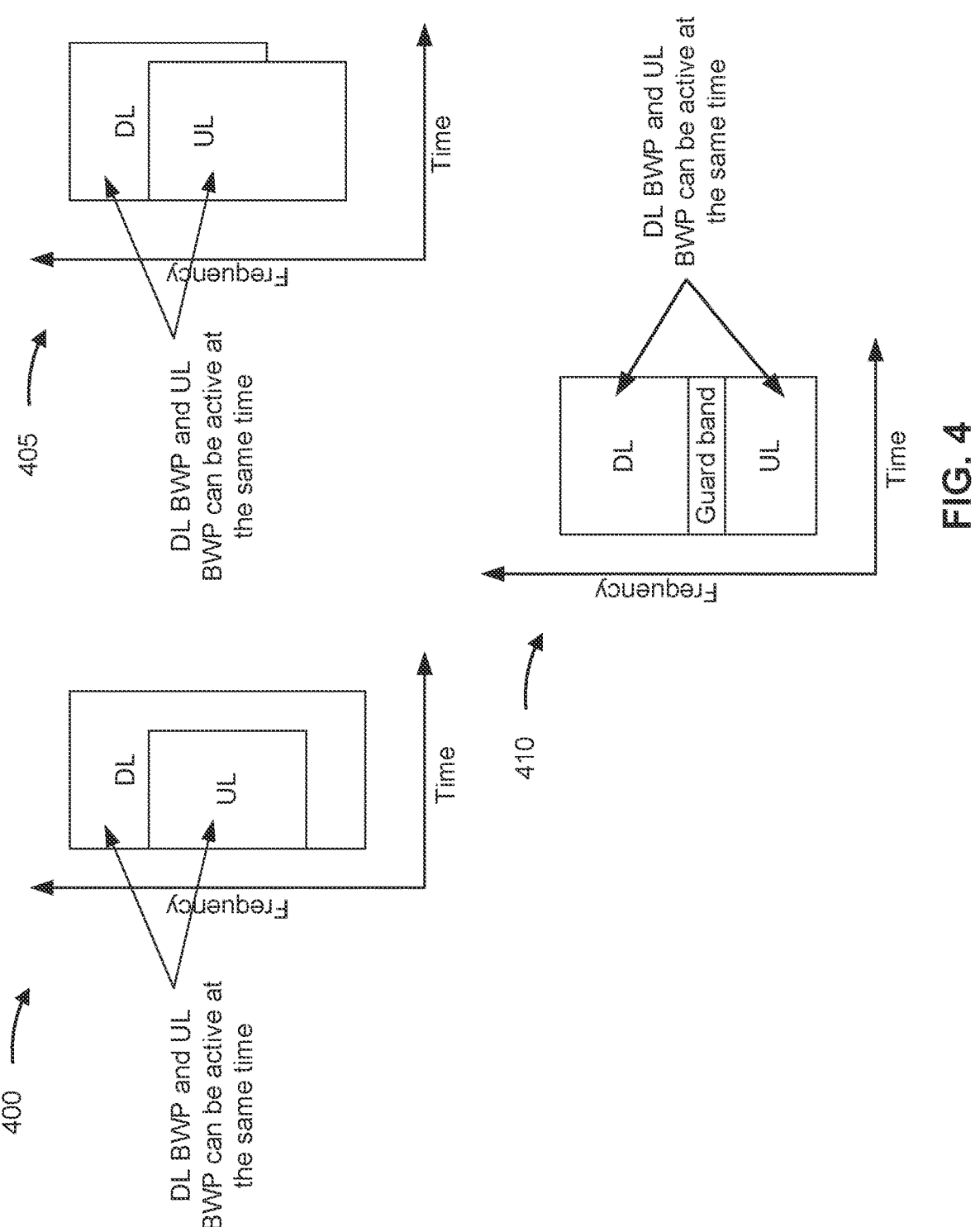
FIG. 4 is a diagram illustrating examples of FD communication in a wireless network, in accordance with the present disclosure.

FIG. 4 is a diagram illustrating examples 400, 405, and 410 of FD communication in a wireless network, in accordance with the present disclosure.

As shown in FIG. 4, examples 400 and 405 show examples of in-band full-duplex (IBFD) communication. In IBFD, a network node may transmit a downlink communication and receive an uplink communication on the same time and frequency resources. As shown in example 400, in a first example of IBFD, which may be referred to a "fully overlapping IBFD," the time and frequency resources for uplink communication may fully overlap with the time and frequency resources for downlink communication. As shown in example 405, in a second example of IBFD, which may be referred to as "partial overlapping IBFD," the time and frequency resources for uplink communication may partially overlap with the time and frequency resources for downlink communication.

As further shown in FIG. 4, example 410 shows an example of SBFD communication, which may also be referred to as "sub-band frequency division duplex (SBFDD)" or "flexible duplex." In SBFD, a network node may transmit a downlink communication and receive an uplink communication at the same time, but on different frequency resources. For example, the different frequency resources may be sub-bands of a frequency band, such as a time division duplexing band. In such examples, the frequency resources used for downlink communication (for example, the downlink sub-band) may be separated from the frequency resources used for uplink communication (for example, the uplink sub-band), in the frequency domain, by a guard band.

Figure 5:
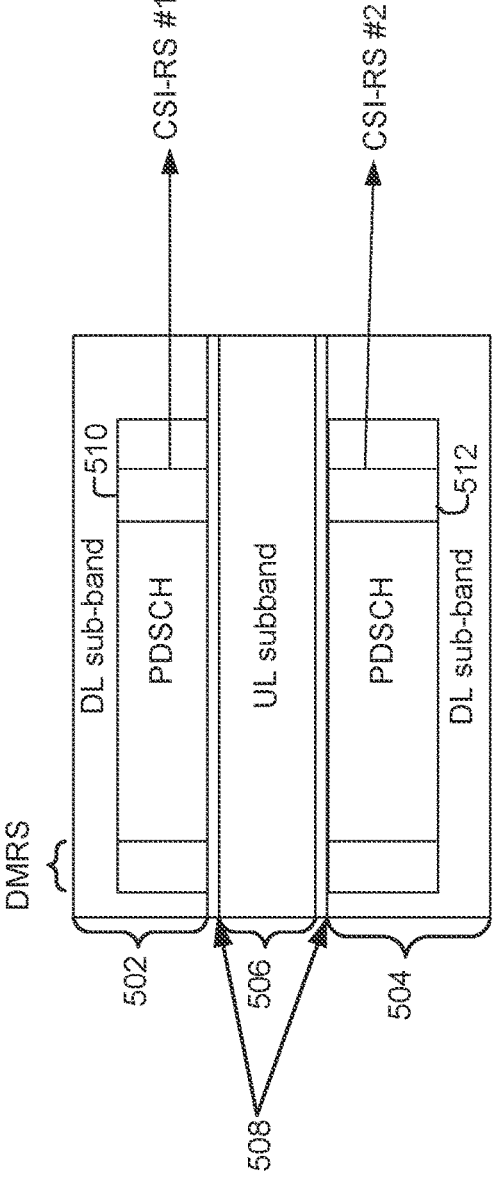
FIG. 5 is a diagram illustrating an example of linked channel state information reference signal (CSI-RS) resources in different downlink sub-bands of a sub-band full duplex (SBFD) slot, in accordance with the present disclosure.

"SBFD slot" may refer to a slot in which an SBFD format is used. An SBFD format may include a slot format in which full duplex communication is supported (for example, for both uplink and downlink communications), with one or more frequencies used for an uplink sub-band of the slot being separated from one or more frequencies used for a downlink sub-band of the slot by a guard band. In some examples, the SBFD format may include a single uplink sub-band and a single downlink sub-band separated by a guard band. In some examples, the SBFD format may include multiple downlink sub-bands and a single uplink sub-band that is separated from the multiple downlink SBs by respective guard bands (for example, as shown in FIG. 5). In some examples, an SBFD format may include multiple uplink sub-bands and a single downlink sub-band that is separated from the multiple uplink sub-bands by respective guard bands. In some examples, the SBFD format may include multiple uplink sub-bands and multiple downlink sub-bands, where each uplink sub-band is separated from a downlink sub-band by a guard band. In some examples, operating using an SBFD mode may include activating or using an FD mode in one or more slots based on or otherwise associated with the one or more slots having the SBFD format. A slot may support the SBFD mode if an uplink bandwidth part (BWP) and a downlink BWP are permitted to be or are simultaneously active in the slot in an SBFD fashion (for example, with guard band separation). "SBFD symbol" may refer to a symbol (e.g., an OFDM symbol) in which an SBFD format is used. In some examples, SBFD operation may be activated at a slot level, and an SBFD symbol may be a symbol of an SBFD slot. In some examples, SBFD operation may be activated at a symbol level, and a slot may include one or more SBFD symbols and one or more non-SBFD symbols.

FIG. 5 is a diagram illustrating an example 500 of linked CSI-RS resources in different downlink sub-bands of an SBFD slot, in accordance with the present disclosure.

A CSI-RS may carry information used for downlink channel estimation (e.g., downlink CSI acquisition), which may be used for scheduling, link adaptation, or beam management, among other examples. A network node may configure a set of CSI-RSs for a UE, and the UE may measure the configured set of CSI-RSs. The UE may perform channel estimation based on or otherwise associated with the measurements, and the UE may report channel estimation parameters, such as a CQI, a precoding matrix indicator (PMI), a CSI-RS resource indicator (CRI), a layer indicator (LI), a rank indicator (RI), or a reference signal received power (RSRP), among other examples, to the network node (e.g., in a CSI report). The network node may use the CSI report to select transmission parameters for downlink communications to the UE, such as a number of transmission layers (e.g., a rank), a precoding matrix (e.g., a precoder), an MCS, or a refined downlink beam (e.g., using a beam refinement procedure or a beam management procedure), among other examples.

The network node may configure CSI-RS resources (e.g., time and frequency resources for CSI-RSs) via one or more CSI resource configurations (e.g., CSI-ResourceConfig) transmitted to the UE via radio resource control (RRC) signaling. A CSI resource configuration (e.g., CSI-ResourceConfig) may configure one or more CSI-RS resource sets (e.g., NZP-CSI-RS-ResourceSet), and each CSI-RS resource set May include one or more CSI-RS resources. A CSI resource configuration (e.g., CSI-ResourceConfig) may indicate a resource type (e.g., resourceType) that specifies a time domain behavior (e.g., aperiodic, semi-persistent, or periodic) for the CSI-RS resource(s) configured by the CSI resource configuration. Currently (e.g., in a current version of a 3GPP wireless communication), for periodic and semi-persistent CSI-RS resources, the quantity of CSI-RS resource sets configured in a CSI resource configuration (e.g., CSI-ResourceConfig) may be restricted to one, unless the UE is configured with group-based beam reporting (e.g., groupBasedBeamReporting-r17). That is, for periodic and semi-persistent CSI-RS resources, when the UE is configured with groupBasedBeamReporting-r17, the quantity of CSI resource sets configured in a CSI-ResourceConfig may be S=2; otherwise, the quantity of CSI-RS resource sets configured in a CSI-ResourceConfig may be limited to S=1. In some examples, when a UE is configured with multiple CSI-ResourceConfigs including the same non-zero-power (NZP) CSI-RS identifier (ID), the UE may expect that the same time domain behavior (e.g., aperiodic, semi-persistent, or periodic) is configured for the CSI-ResourceConfigs. In some examples, a UE may not expect to be configured with more than one CSI-RS resource in a CSI-RS resource set (e.g., NZP-CSI-RS-ResourceSet) for channel measurement for a CSI-ResourceConfig with the higher layer parameter codebookType set to typeII, typeII-PortSelection, typeII-r16, typeII-PortSelection-r16, or typeII-PortSelection-r17.

As shown in FIG. 5, in some examples, an SBFD format for an SBFD slot may include multiple (e.g., two) downlink sub-bands 502 and 504 and an uplink sub-band 506 that is separated from the downlink sub-bands by guard bands 508. The symbols of the SBFD slot may be SBFD symbols configured for downlink transmissions (e.g., DMRS transmissions, physical downlink shared channel (PDSCH) transmissions, and/or CSI-RS transmissions, among other examples) in the downlink sub-bands 502 and 504 and uplink transmissions in the uplink sub-band 506. In some examples, because the downlink sub-bands 502 and 504 are separated by the uplink sub-band 506 and the guard bands 508, it may be difficult to allocate CSI-RS resources for downlink channel estimation across the downlink sub-bands 502 and 504. For example, downlink channel estimation based on or otherwise associated with a CSI-RS transmitted in a CSI-RS resource allocated in a single downlink sub-band may not accurately reflect channel conditions across both downlink sub-bands 502 and 504, and a CSI-RS resource allocated across both downlink sub-bands 502 and 504 includes frequencies of the uplink sub-band 506 and the guard bands 508.

In some aspects, a UE may be configured with a linked pair of CSI-RS resources for SBFD symbols. As shown in FIG. 5, the linked pair of CSI-RS resources may include a first CSI-RS resource 510 on downlink sub-band 502 and a second CSI-RS resource 512 on downlink sub-band 504. A "linked pair of CSI-RS resources" or "linked CSI-RS resources" (e.g., CSI-RS resources 510 and 512 in FIG. 5) refers to CSI-RS resources for which measurements of the corresponding CSI-RSs are used together to determine at least one CSI metric (e.g., CQI, PMI, CRI, LI, RI, and/or RSRP, among other examples) reported in a CSI report. For example, a network node may transmit a first CSI-RS (e.g., CSI-RS #1) in the first CSI-RS resource 510 and a second CSI-RS (e.g., CSI-RS #2) in the second CSI-RS resource 512. The UE may perform measurements of the first CSI-RS and the second CSI-RS, and the UE may transmit, to the network node, a CSI report that includes at least one CSI metric (e.g., CQI, PMI, CRI, LI, RI, and/or RSRP, among other examples) based on or otherwise associated with the measurements of the first CSI-RS and the second CSI-RS. In this way, the at least one CSI metric included in the CSI report may more accurately reflect the downlink channel conditions across both downlink sub-bands 502 and 504. However, there is currently no signaling mechanism for configuring a UE with a linked pair of CSI-RS resources for SBFD symbols.

Some techniques and apparatuses described herein enable linked CSI-RS resources for SBFD symbols. In some aspects, a UE may receive, from a network node, a CSI resource configuration (e.g., CSI-ResourceConfig) that indicates a linked pair of CSI-RS resources for SBFD symbols. The linked pair of CSI-RS resources may include a first CSI-RS resource on a first downlink sub-band and a second CSI-RS resource on a second downlink sub-band. The UE may receive a first CSI-RS in the first CSI-RS resource and a second CSI-RS in the second CSI-RS resource, and the UE may transmit, to the network node, a CSI report including at least one CSI metric associated with measurements of the first CSI-RS and the second CSI-RS. As a result, accuracy of the downlink channel conditions reflected in the CSI report may be increased.

In some other aspects, a UE may receive, from a network node, multiple CSI resource configurations (e.g., CSI-ResourceConfigs) indicating respective CSI-RS resources. The UE may receive, from the network node, an indication of a linked pair of CSI-RS resources of the CSI-RS resources indicated by the CSI resource configurations. The linked pair of CSI-RS resources may include a first CSI-RS resource on a first downlink sub-band and a second CSI-RS resource on a second downlink sub-band. The UE may receive a first CSI-RS in the first CSI-RS resource and a second CSI-RS in the second CSI-RS resource, and the UE may transmit, to the network node, a CSI report including at least one CSI metric associated with measurements of the first CSI-RS and the second CSI-RS. As a result, accuracy of the downlink channel conditions reflected in the CSI report may be increased.

In some aspects, a UE may configured with a plurality of linked CSI-RS resources for SBFD symbols. FIG. 5 shows an example in which a UE is configured with two linked CSI-RS resources (e.g., a linked pair of CSI-RS resources) for SBFD symbols. In some other examples, a UE may be configured with more than two (e.g., three or more) linked CSI-RS resources for SBFD symbols. For example, an SBFD format for an SBFD slot may include three or more downlink sub-bands, and the UE may be configured with a set of linked CSI-RS resources that includes a respective CSI-RS resource in each downlink sub-band associated with the SBFD format. In such examples, the UE may perform measurements of CSI-RSs in the set of linked CSI-RS resources, and the UE may determine at least one CSI metric (e.g., CQI, PMI, CRI, LI, RI, and/or RSRP, among other examples) to be reported in a CSI report based on or otherwise associated with the measurements performed in the set of linked CSI-RS resources. In some aspects, the UE may receive a CSI resource configuration (e.g., CSI-ResourceConfig) that indicates a plurality of CSI-RS resources for SBFD symbols. In some other aspects, the UE may receive multiple CSI resource configurations (e.g., CSI-ResourceConfigs) indicating respective CSI-RS resources, and the UE may receive an indication of a plurality of linked CSI-RS resources of the CSI-RS resources indicated by the CSI resource configurations.

As indicated above, FIG. 5 is provided as an example. Other examples may differ from what is described with respect to FIG. 5.

Figure 6A:
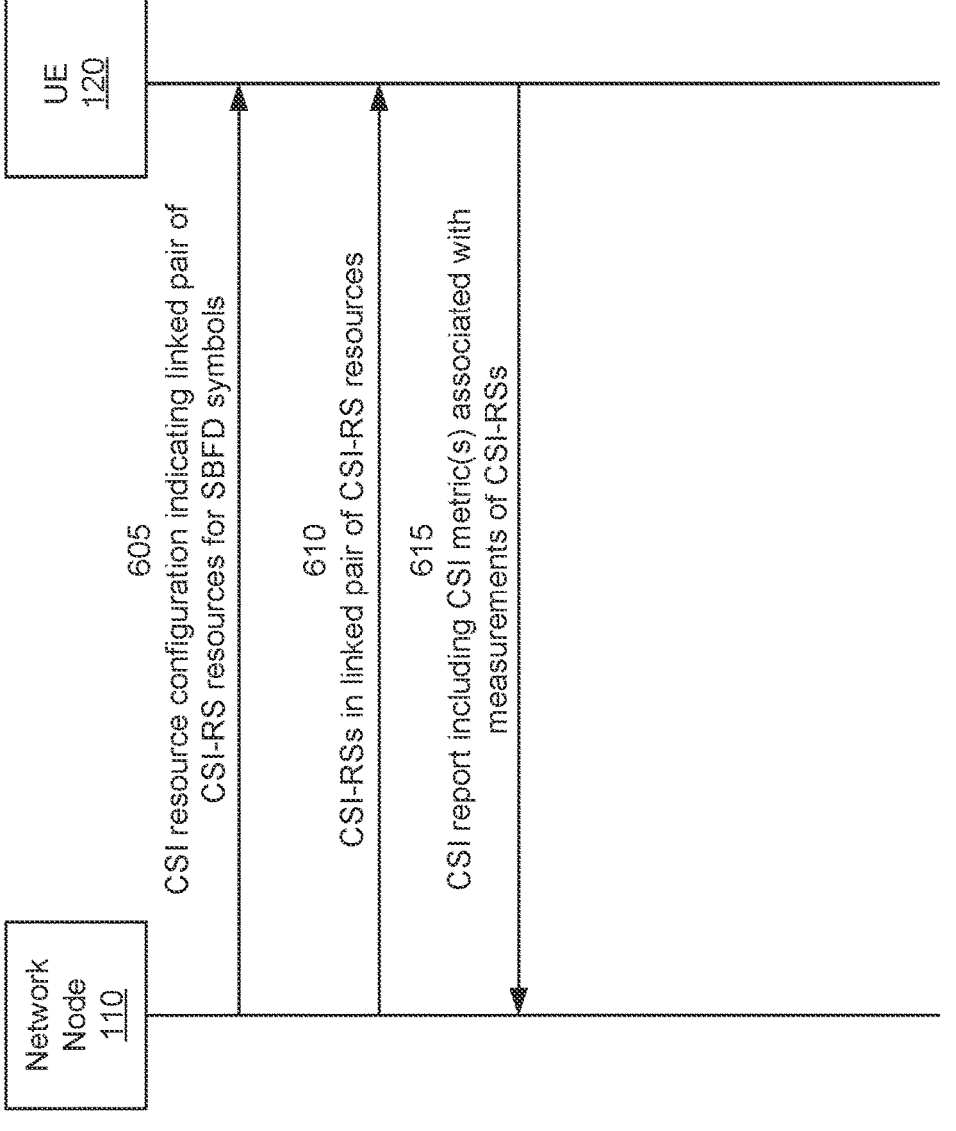
FIGS. 6A-6D are diagrams illustrating an example associated with linked CSI-RS resources for SBFD, in accordance with the present disclosure.

FIGS. 6A-6D are diagrams illustrating an example 600 associated with linked CSI-RS resources for SBFD, in accordance with the present disclosure. As shown in FIG. 6A, example 600 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 6A, and by reference number 605, the network node 110 may transmit, and the UE 120 may receive, a CSI resource configuration (e.g., CSI-ResourceConfig) indicating a linked pair of CSI-RS resources for SBFD symbols. The linked pair of CSI-RS resources may include a first CSI-RS resource allocated in a first downlink sub-band and a second CSI-RS resource allocated in a second downlink sub-band. In some aspects, both CSI-RS resources of the linked pair of CSI-RS resources may be indicated in the same CSI-ResourceConfig. The network node 110 may transmit the CSI resource configuration (e.g., CSI-ResourceConfig) indicating the linked pair of CSI-RS resources for SBFD symbols to the UE 120 via RRC signaling (e.g., in an RRC message).

Figure 6B:
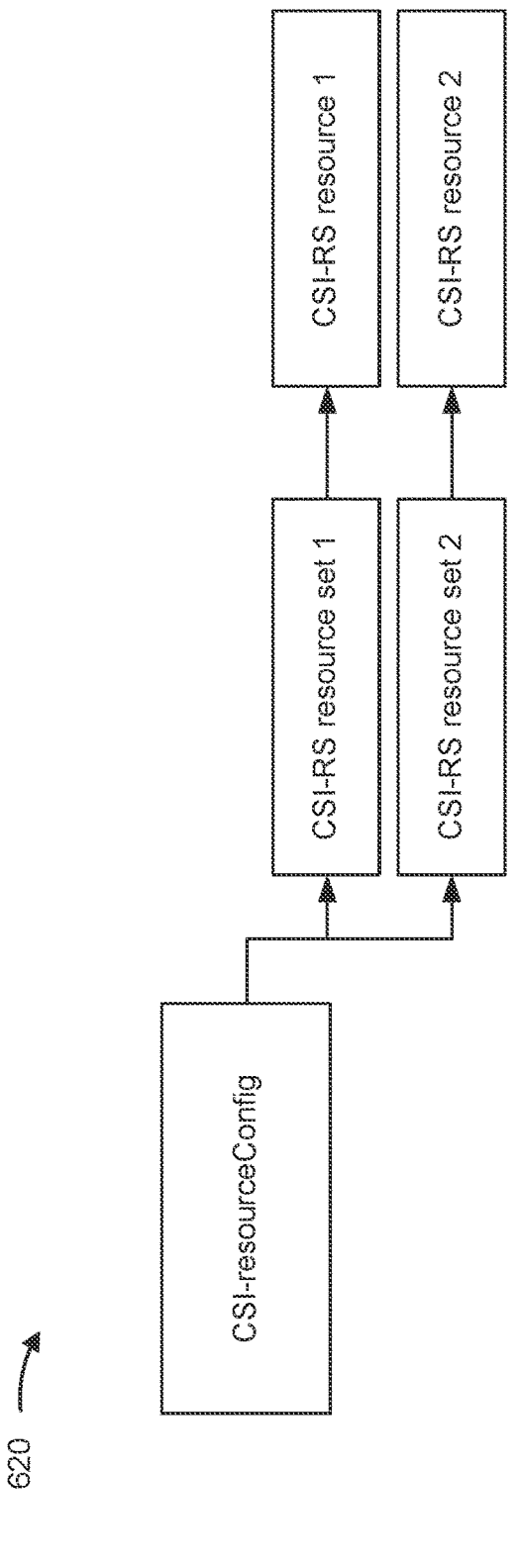

In some aspects, as shown in FIG. 6B, the two CSI-RS resources of the linked pair of CSI-RS resources may be included in different CSI-RS resource sets in the same CSI resource configuration (e.g., CSI-ResourceConfig). As shown by reference number 620 of FIG. 6B, the CSI resource configuration (CSI-ResourceConfig) may indicate a first CSI-RS resource set (CSI-RS resource set 1) including the first CSI-RS resource (CSI-RS resource 1) of the linked pair of CSI-RS resources, and the CSI resource configuration (CSI-ResourceConfig) may indicate a second CSI-RS resource set (CSI-RS resource set 2) including the second CSI-RS resource (CSI-RS resource 2) of the linked pair of CSI-RS resources. In such examples, the CSI-ResourceConfig may include two CSI-RS resource sets (e.g., CSI-RS resource set 1 and CSI-RS resource set 2) to configure a linked pair of periodic or semi-persistent CSI-RS resources for SBFD symbols, even when group-based beam reporting (e.g., groupBasedBeamReporting-r17) is not configured for the UE 120. In some examples, the CSI resource configuration may include an indication of SBFD operation, and the CSI resource configuration may indicate two CSI-RS resource sets (e.g., CSI-RS resource set 1 and CSI-RS resource set 2) based on or otherwise in association with the CSI resource configuration including the indication of SBFD operation. For example, the indication of SBFD operation may be an SBFD flag that indicates a first value (e.g., 1) if SBFD operation is enabled or a second value (e.g., 0) is SBFD operation is not enabled. In such examples, two CSI-RS resources (e.g., CSI-RS resource set 1 and CSI-RS resource set 2) indicating the linked pair of periodic or semi-persistent CSI-RS resources (e.g., CSI-RS resource 1 and CSI-RS resource 2) may be indicated in the same CSI-ResourceConfig if the SBFD flag indicates the first value. In such examples, the UE 120 may not be expected to be configured with two CSI-RS resource sets for periodic or semi-persistent CSI-RS resources in the same CSI-ResourceConfig unless the SBFD flag indicates the first value.

In some aspects, a plurality of linked CSI-RS resources that includes three or more linked CSI-RS resources (e.g., each in a respective downlink sub-band) may be included in different CSI-RS resource sets in the same CSI resource configuration (e.g., CSI-ResourceConfig). For example, the CSI resource configuration (e.g., CSI-ResourceConfig) may indicate three or more CSI-RS resource sets, each including a respective CSI-RS resource of the plurality of linked CSI-RS resources. In such examples, the CSI resource configuration may include an indication of SBFD operation (e.g., the SBFD flag), and the CSI resource configuration may indicate multiple CSI-RS resource sets based on or otherwise associated with the indication of SBFD operation (e.g., the SBFD flag) indicating that SBFD operation is enabled. In some examples, when SBFD operation is enabled, the number of CSI-RS resource sets indicated in the CSI resource configuration may be based on or otherwise associated with a number of downlink sub-bands configured in an SBFD format associated with the SBFD operation. For example, when the SBFD flag indicates the SBFD operation is enabled, the UE 120 may expect to be configured with a number of CSI-RS resources sets corresponding to the number of downlink sub-bands in the SBFD format. In some examples, when the SBFD flag indicates that SBFD operation is enabled, the CSI resource configuration may further indicate the number of CSI-RS resources sets indicated in the CSI resource configuration.

Figure 6C:
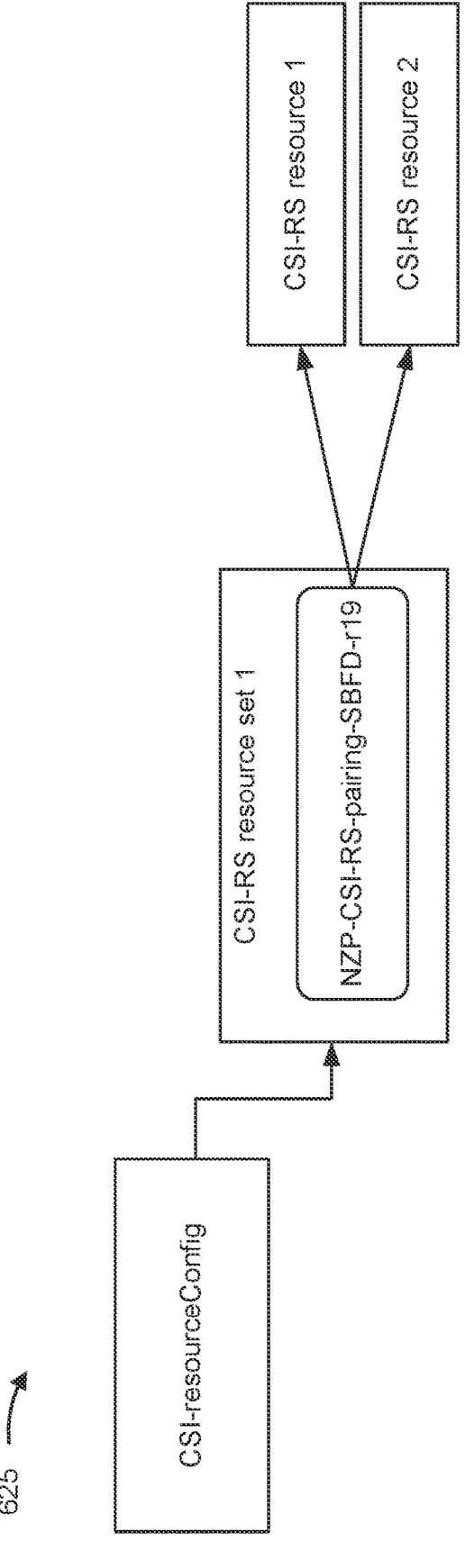

In some other aspects, as shown in FIG. 6C, the two CSI-RS resources of the linked pair of CSI-RS resources may be included in the same CSI-RS resource set indicated in the CSI resource configuration. As shown by reference number 625 of FIG. 6C, the CSI resource configuration (CSI-ResourceConfig) may indicate a CSI-RS resource set (CSI-RS resource set 1) that includes a linked pairing indication (shown as NZP-CSI-RS-pairing-SBFD-r19) that indicates the linked pair of CSI-RS resources for SBFD symbols. The linked pairing indication (e.g., NZP-CSI-RS-pairing-SBFD-r19) may be a field (e.g., a new field) of the CSI-RS resource set (e.g., CSI-RS resource set 1) that defines the linkage between two CSI-RS resources and indicates that the linked pair of CSI-RS resources are for SBFD operation. In some examples, the linked pairing indication (e.g., NZP-CSI-RS-pairing-SBFD-r19) may indicate identifiers (IDs) associated with the linked CSI-RS resources. For example, the linked pairing indication (e.g., NZP-CSI-RS-pairing-SBFD-r19) may indicate a first ID associated with the first CSI-RS resource (CSI-RS resource 1) of the linked pair of CSI-RS resources and a second ID associated with the second CSI-RS resource (CSI-RS resource 2) of the linked pair of CSI-RS resources.

In some aspects, a plurality of linked CSI-RS resources that includes three or more linked CSI-RS resources (e.g., each in a respective downlink sub-band) may be included in the same CSI-RS resource set indicated in the CSI resource configuration. For example, the CSI resource configuration (CSI-ResourceConfig) may indicate a CSI-RS resource set that includes a linkage indication (e.g., NZP-CSI-RS-pairing-SBFD-r19) that indicates the plurality of linked CSI-RS resources for SBFD symbols. The linkage indication may be a field of the CSI-RS resource set that defines the linkage between the plurality of linked CSI-RS resources and indicates that the plurality of linked CSI-RS resources are for SBFD operation. In some examples, the linkage indication may indicate respective indicate identifiers (IDs) associated with the plurality of linked CSI-RS resources. In some examples, the number of linked CSI-RS resources indicated by the linkage indication in the CSI-RS resource set may correspond to a number of downlink sub-bands configured in an SBFD format associated with the SBFD operation. In some examples, the linkage indication may include one or more bits that indicate the number of CSI-RS resource IDs indicated in the linkage indication.

Figure 6D:
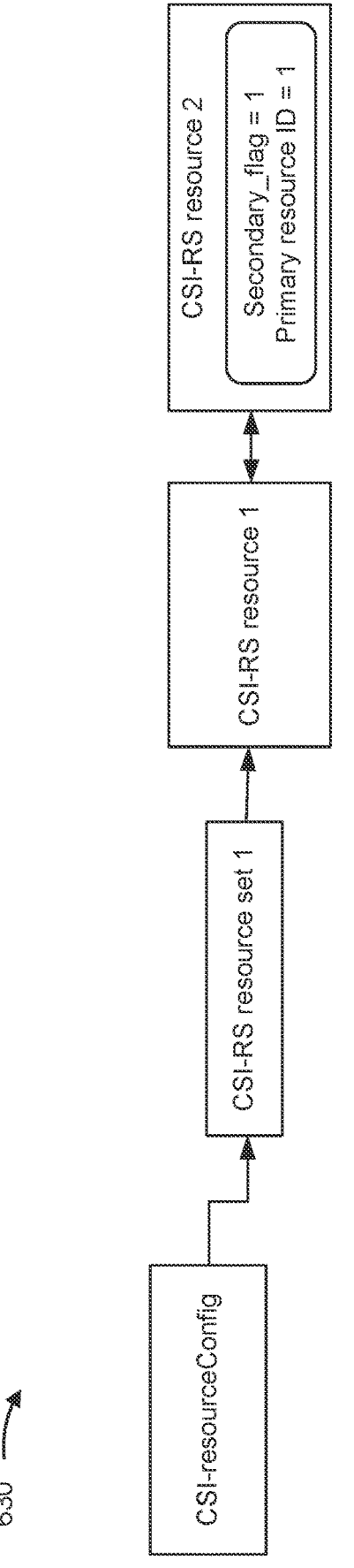

In some other aspects, as shown in FIG. 6D, the two CSI-RS resources of the linked pair of CSI-RS resources may be configured as a primary CSI-RS resource and a secondary CSI-RS resource associated with the primary CSI-RS resource. As shown by reference number 630 of FIG. 6D, the CSI resource configuration (CSI-ResourceConfig) may indicate a CSI-RS resource set (CSI-RS resource set 1) that includes an indication of a primary CSI-RS resource (CSI-RS resource 1) and an indication of a secondary CSI-RS resource (CSI-RS resource 2). The primary CSI-RS resource (e.g., CSI-RS resource 1) may be associated with a CSI report, and the secondary CSI-RS resource (e.g., CSI-RS resource 2) is linked to the primary CSI-RS resource (e.g., for SBFD symbols). In some examples, the indication of the secondary CSI-RS resource may be included in the same CSI-RS resource set as the indication of the first CSI-RS resource. In some other examples, the indication of the secondary CSI-RS resource may be included in a different CSI-RS resource set from the indication of the primary CSI-RS resource (e.g., in the same CSI-ResourceConfig or in a different CSI-ResourceConfig). The UE 120 may determine the linkage between the primary CSI-RS resource (e.g., CSI-RS resource 1) and the secondary CSI-RS resource (e.g., CSI-RS resource 2) based on or otherwise associated with the RRC configuration of the secondary CSI-RS resource (e.g., the NZP-CSI-RS). For example, the indication of the secondary CSI-RS resource (e.g., CSI-RS resource 2) may include an indication, such as a flag (shown as Secondary_flag=1), that indicates that this CSI-RS resource is linked to a primary CSI-RS resource, and the indication of the secondary CSI-RS resource (e.g., CSI-RS resource 2) may also include an ID associated with the linked primary CSI-RS resource (shown as Primary resource ID=1).

In some aspects, a plurality of linked CSI-RS resources that includes three or more linked CSI-RS resources (e.g., each in a respective downlink sub-band) may be configured as a primary CSI-RS resource and multiple secondary CSI-RS resources associated with the primary CSI-RS resource. In such examples, multiple secondary CSI-RS resources may be linked to the same primary CSI-RS resource to configure the plurality of linked CSI-RS resources. The primary CSI-RS resource may be associated with a CSI report, and the multiple secondary CSI-RS resources may each be linked to the primary CSI-RS resource (e.g., for SBFD symbols). In some examples, the primary CSI-RS resource and the multiple secondary CSI-RS resources may be included in the same CSI-RS resource set. In some other examples, one or more of the multiple secondary CSI-RS resources may be included in a different CSI-RS resource set from the primary CSI-RS resource (e.g., in the same CSI-ResourceConfig or in one or more different CSI-ResourceConfigs). The linkage between each secondary CSI-RS set and the primary CSI-RS resource may be indicate in the respective RRC configuration of each secondary CSI-RS resource (e.g., the NZP-CSI-RS). For example, similar to CSI-RS resource 2 shown in FIG. 6D, the respective configuration of each secondary CSI-RS resource may include a flag (e.g., Secondary_flag=1), that indicates that the CSI-RS resource is linked to a primary CSI-RS resource, and an ID associated with the linked primary CSI-RS resource (shown as Primary resource ID=1).

In some aspects, the linked pair of CSI-RS resources (or plurality of linked CSI-RS resources) indicated in the CSI resource configuration (e.g., in different CSI-RS resource sets, in the same CSI-RS resource set, or as primary and second CSI-RS resources) may be associated with the same symbols and/or a same slot location. In examples in which the linked pair of CSI-RS resources are associated with the same slot, the linked pair of CSI-RS resources may be configured with the same periodicity and offset. Additionally or alternatively, the linked pair of CSI-RS resources (or plurality of linked CSI-RS resources) may be associated with the same CSI-RS port configuration. For example, the linked pair of CSI-RS resources may be configured with the same number of ports and the same code division multiplexing (CDM) type. Additionally or alternatively, the linked pair of CSI-RS resources (or plurality of linked CSI-RS resources) may be associated with the same scrambling ID (e.g., a same sequence). Additionally or alternatively, the linked pair of CSI-RS resources (or plurality of linked CSI-RS resources) may be associated with the same power offset. Additionally or alternatively, the linked pair of CSI-RS resources (or plurality of linked CSI-RS resources) may be associated with resource block (RB) density. For example, the density of RBs in each CSI-RS resource of the linked pair of CSI-RS resources may be 0.5 or 1. In some aspects, the linked pair of CSI-RS resources may be restricted (e.g., in accordance with a wireless communication standard, such as a 3GPP standard) to have one or more of the same symbol allocation, the same slot allocation (e.g., the same periodicity and offset), the same CSI-RS port configuration (e.g., the same number of ports and/or the same CDM type), the same scrambling ID (e.g., the same sequence), the same power offset, and/or the same RB density.

The two CSI-RS resources of the linked pair of CSI-RS resources may be configured on different downlink sub-bands. For example, the linked pair of CSI-RS resources may include the first CSI-RS resource on the first downlink sub-band and the second downlink CSI-RS resource on the second downlink sub-band. In some aspects, the first downlink sub-band and the second downlink sub-band may not overlap. For example, the linked pair of CSI-RS resources may be restricted (e.g., in association with a wireless communication standard, such as a 3GPP standard) to be configured on different downlink sub-bands with no overlap in the frequency domain resources of the linked pair of CSI-RS resources. In some examples in which a plurality of linked CSI-RS resources that includes three or more linked CSI-RS resources is configured, the plurality of linked CSI-RS resources may be configured on a plurality of different downlink sub-bands that do not overlap in the frequency domain. In some aspects, the linked pair of CSI-RS resources (or plurality of linked CSI-RS resources) may only be configured on SBFD symbols. For example, the UE 120 may not expect the linked pair of CSI-RS resources to be configured on non-SBFD symbols. In some aspects, the linked pair of CSI-RS resources (or plurality of linked CSI-RS resources) configured in the same CSI resource configuration (e.g., CSI-ResourceConfig) may be configured with the same time domain behavior (e.g., aperiodic, semi-persistent, or periodic). For example, the CSI-ResourceConfig may indicate a resource type (e.g., aperiodic, semi-persistent, or periodic) that applies to both of the linked pair of CSI-RS resources configured in the CSI-ResourceConfig.

In some aspects, the linked pair of CSI-RS resources (or plurality of linked CSI-RS resources) may be associated with different symbols or different slots. For example, the linked pair of CSI-RS resources may be permitted to be configured in different symbols in the same slot or in different slots in a frame. In some examples in which the linked pair of CSI-RS resources are configured in different symbols or slots, a timing requirement (Z') associated with a CSI report computation time may be defined relative to a later-occurring (in time) CSI-RS resource of the linked pair of CSI-RS resources (e.g., the later-occurring one of the first CSI-RS and the second CSI-RS). In this way, the timing requirement (Z') may ensure that the UE 120 has sufficient time to prepare the CSI report. In some examples in which three or more linked CSI-RS resources are configured in different slots or symbols, the timing requirement (Z') may be defined relative to a latest-occurring (in time) CSI-RS resource of the three or more linked CSI-RS resources. In some examples in which the linked pair of CSI-RS resources (or plurality of linked CSI-RS resources) are configured in different symbols or slots and the CSI report is a periodic or semi-persistent CSI report, in order to determine CSI processing unit (CPU) occupation, CPUs may be allocated from a time of the occurrence of the latest-occurring (in time) CSI-RS resource used to calculate the CSI report. In such examples, the latest-occurring CSI-RS resource used to calculate the CSI report is the later-occurring CSI-RS resource of the linked pair of CSI-RS resources (e.g., the later-occurring one of the first CSI-RS and the second CSI-RS). A CSI reference resource associated with a periodic or semi-persistent CSI report defines a last slot in which a measurement to be including in a CSI report instance can occur. In some examples in which the linked pair of CSI-RS resources (or two or more CSI-RS resources of a plurality of linked CSI-RS resources) are configured in different slots and the CSI report is periodic or semi-persistent, the CSI reference resource associated with the CSI report applies to each of the linked CSI-RS resources (e.g., each of the first CSI-RS and the second CSI-RS).

Returning to FIG. 6A, as shown by reference number 610, the network node 110 may transmit, and the UE 120 may receive, CSI-RSs in the linked pair of CSI-RS resources for SBFD symbols. For example, the network node 110 may transmit, and the UE 120 may receive, a first CSI-RS in the first CSI-RS resource on the first downlink sub-band and a second CSI-RS in the second CSI-RS resource on the second downlink sub-band.

In some aspects, the first and second CSI-RS resources may be periodic CSI-RS resources, and the first and second CSI-RSs may be periodic CSI-RSs. In some aspects, the first and second CSI-RS resources may be semi-persistent CSI-RS resources, and the first and second CSI-RSs may be semi-persistent CSI-RSs. In such examples, prior to transmitting the first and second CSI-RSs to the UE 120, the network node 110 may transmit, and the UE 120 may receive, a medium access control (MAC) control element (MAC-CE) that indicates activation of the first and second CSI-RS resources. In some aspects, the first and second CSI-RS resources may be aperiodic CSI-RS resources, and the first and second CSI-RSs may be aperiodic CSI-RSs. In such examples, the reception and measurement of the first and second CSI-RSs may be triggered by downlink control information (DCI) transmitted by the network node 110 and received by the UE 120.

In some aspects, the linkage between two CSI-RS resources may be updated via a MAC-CE. For example, the network node 110 may transmit, and the UE 120 may receive, a MAC-CE that indicates an update to the linked pair of CSI-RS resources (e.g., a change from one linked pair of CSI-RS resources to another linked pair of CSI-RS resources). In some aspects, in examples in which the linked pair of CSI-RS resources are indicated in the same CSI-RS resource set (e.g., as described in connection with FIG. 6C), the linked pairing indication (e.g., NZP-CSI-RS-pairing-SBFD-r19) included in the CSI-RS resource set may be configured as a list of linked pairs of CSI-RS resources. That is, the CSI-RS resource set indicated in the CSI resource configuration may indicate a plurality of linked pairs of CSI-RS resources. In such examples, the network node 110 may transmit, and the UE 120 may receive, a MAC-CE that activates a linked pair of CSI-RS resources of the plurality of linked pairs of CSI-RS resources indicated in the CSI-RS resource set.

The UE 120 may perform measurements (e.g., downlink channel measurements) of the first CSI-RS transmitted in the first CSI-RS resource and the second CSI-RS transmitted in the second CSI-RS resource. For example, the UE 120 may perform RSRP measurements of the first and second CSI-RSs and/or signal-to-interference-plus-noise ratio (SINR) measurements of the first and second CSI-RSs, among other examples.

In some examples, a CSI-RS of the CSI-RSs transmitted in the linked pair of CSI-RS resources may be dropped (e.g., the UE 120 may skip measuring the CSI-RS). For example, if a CSI-RS resource of the linked pair of CSI-RS resources is punctured and a quantity of remaining RBs in the CSI-RS resource does not satisfy (e.g., is less than) a threshold value (e.g., 24 RBs), the corresponding CSI-RS may be dropped (e.g., the UE 120 may skip measuring the CSI-RS). In some aspects, if the CSI-RS in one CSI-RS resource of the linked pair of CSI-RS resources is dropped for any reason, the UE 120 may not be required to measure the other CSI-RS in the other CSI-RS resource of the linked pair of CSI-RS resources. For example, if the first CSI-RS in the first CSI-RS resource is dropped, the UE 120 may skip perform-ing the measurement of the second CSI-RS in the second CSI-RS resource in connection with the first CSI-RS being dropped. In some aspects, if the CSI-RS in one CSI-RS resource of the linked pair of CSI-RS resources is dropped, the UE 120 may still measure the CSI-RS in the other CSI-RS resource of the linked pair of CSI-RS resources. For example, if the first CSI-RS in the first CSI-RS resource is dropped, the UE 120 may perform the measurement of the second CSI-RS in the second CSI-RS resource in connection with the first CSI-RS being dropped. In some examples, the UE 120 may perform the measurement of the second CSI-RS in the second CSI-RS resource in connection with the first CSI-RS in the first CSI-RS resource being dropped, only if the first and second CSI-RS resources are semi-persistent or periodic CSI-RS resources. In some other examples, the UE 120 may perform the measurement of the second CSI-RS in the second CSI-RS resource in connection with the first CSI-RS in the first CSI-RS resource being dropped for aperiodic, semi-persistent, or periodic CSI-RS resources.

As further shown in FIG. 6A, and by reference number 615, the UE 120 may transmit, and the network node 110 may receive, a CSI report including at least one CSI metric associated with the measurements of the CSI-RSs in the linked pair of CSI-RS resources. In some aspects, the UE 120 may determine one or more CSI metrics based on or otherwise associated with the measurements of the first CSI-RS in the first CSI-RS resource on the first downlink sub-band and the second CSI-RS in the second CSI-RS resource on the second downlink sub-band, and the UE 120 may include the one or more CSI metrics in the CSI report. For example, the one or more CSI metrics may include one or more of a CQI, a PMI, a CRI, an LI, an RI, and/or an RSRP, among other examples. In some aspects, the UE 120 may determine the one or more CSI metrics (e.g., CQI, PMI, CRI, LI, RI, and/or RSRP) based on or otherwise associated with a combination of the measurements of the CSI-RSs (e.g., the first CSI-RS and the second CSI-RS) in the linked pair of CSI-RS resources.

As indicated above, FIGS. 6A-6D are provided as an example. Other examples may differ from what is described with respect to FIGS. 6A-6D.

Figure 7:
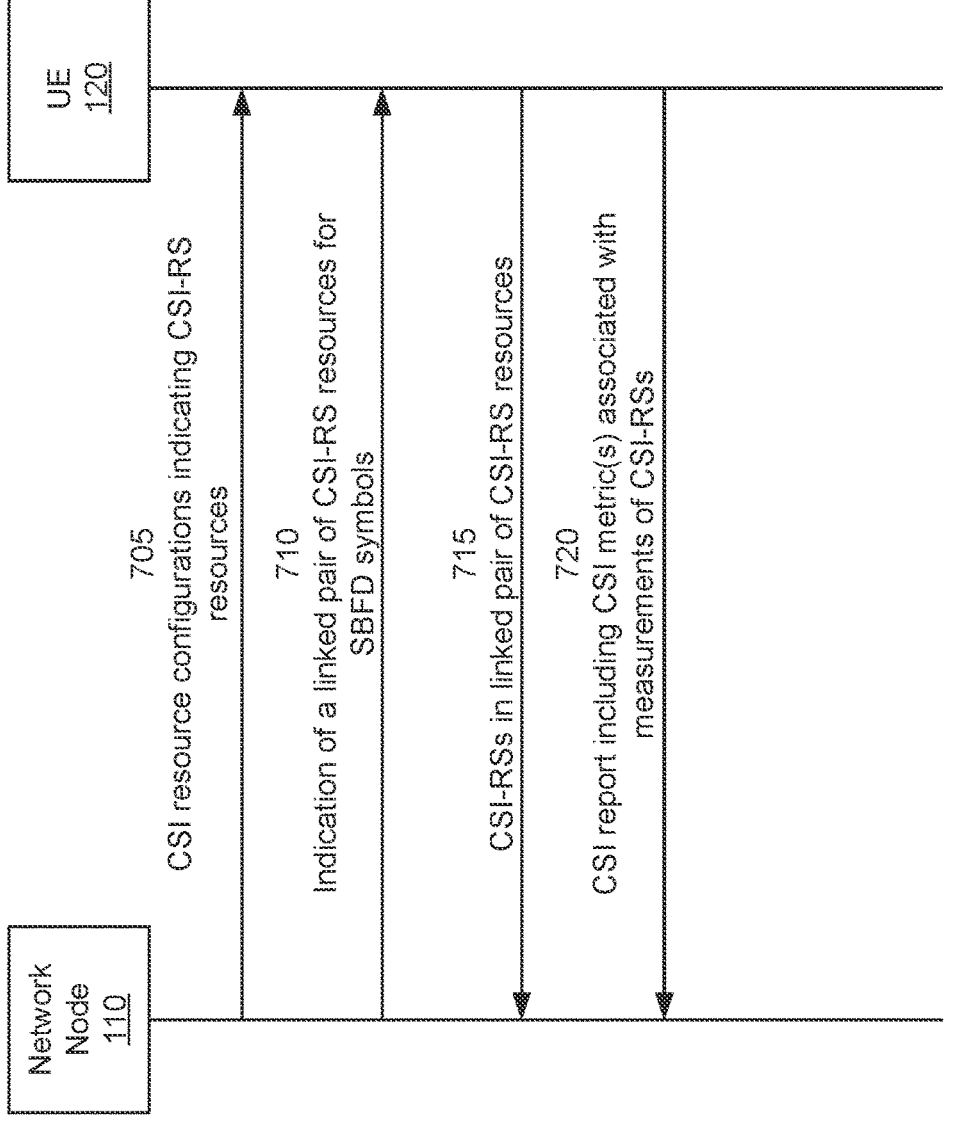
FIG. 7 is a diagram illustrating an example associated with linked CSI-RS resources for SBFD, in accordance with the present disclosure.

FIG. 7 is a diagram illustrating an example 700 associated with linked CSI-RS resources for SBFD, in accordance with the present disclosure. As shown in FIG. 7, example 700 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 7, and by reference number 705, the network node 110 may transmit, and the UE 120 may receive, CSI resource configurations (e.g., CSI-Re-sourceConfigs) indicating CSI-RS resources. In some aspects, the network node 110 may transmit, and the UE 120 may receive, multiple CSI resource configurations, and each CSI resource configuration may indicate a configuration of a respective CSI-RS resource (e.g., indicated in a respective CSI-RS resource set). For example, the network node 110 may transmit, and the UE 120 may receive, at least a first CSI resource configuration (e.g., a first CSI-ResourceCon-fig) indicating a first CSI-RS resource and a second CSI resource configuration (e.g., a second CSI-ResourceConfig) indicating a second CSI-RS resource. The network node 110 may transmit the CSI resource configurations indicating the CSI-RS resources to the UE 120 via RRC signaling (e.g., in one or more RRC messages).

As further shown in FIG. 7, and by reference number 710, the network node 110 may transmit, and the UE 120 may receive, an indication of a linked pair of CSI-RS resources for SBFD symbols. The linked pair of CSI-RS resources may include a first CSI-RS resource allocated in a first downlink sub-band and a second CSI-RS resource allocated in a second downlink sub-band. In some aspects, the linked pair of CSI-RS resources may include CSI-RS resources configured in different CSI resource configurations. For example, the first CSI-RS resource of the linked pair of CSI-RS resources may be indicated in a first CSI resource configuration, and the second CSI-RS resource of the linked pair of CSI-RS resources may be indicated in a second CSI resource configuration.

In some aspects, the indication of the linked pair of CSI-RS resources may be included in a CSI report configu-ration associated with a CSI-report. For example, the net-work node 110 may transmit, and the UE 120 may receive, a CSI report configuration associated with a CSI report, and the CSI report configuration may include the indication of the linked pair of CSI-RS resources. In such examples, the linked pair of CSI-RS resources may include two CSI-RS resources (e.g., the first and second CSI resources) respec-tively configured by two CSI resource configurations (e.g., first and second CSI-ResourceConfigs) that are associated with the same CSI report. In some examples, the CSI report configuration may indicate a first CSI resource configuration (e.g., the first CSI-ResourceConfig) associated with the CSI report, and the CSI report configuration may include an additional field that indicates a second CSI resource con-figuration (e.g., the second CSI-ResourceConfig) for SBFD operation. The network node 110 may transmit the CSI report configuration, including the indication of the linked pair of CSI-RS resources, to the UE 120 via RRC signaling (e.g., in an RRC message). In some aspects, the CSI report configuration may indicate a plurality of linked CSI-RS resources that includes three of more CSI-RS resources (e.g., each in a respective downlink sub-band). For example, the CSI report may indicate a first CSI resource configuration associated with the CSI report, and the CSI report may include multiple additional fields to indicate additional CSI resource configurations for SBFD operation. In such example, the number of additional fields for indicating additional CSI resource configurations for SBFD operation may be based on or otherwise associated with a number of downlink sub-bands configured in an SBFD format associ-ated with the SBFD operation.

In some aspects, the linked pair of CSI-RS resources may include a pair of aperiodic CSI-RS resources (e.g., the first and second CSI-RS resources may be aperiodic CSI-RS resources), and the indication of the linked pair of CSI-RS resources may be included in layer 1 (L1) signaling for triggering measurements of CSI-RSs in the linked pair of CSI-RS resources. For example, the network node 110 may transmit, and the UE 120 may receive, DCI triggering measurements of a first CSI-RS in the first CSI-RS resource and a second CSI-RS in the second CSI-RS resource, and the DCI may include the indication of the linked pair of CSI-RS resources. In such examples, the UE 120 may have no knowledge of which CSI-RS resources are to be linked prior to receiving the DCI. In some examples, the DCI may include an explicit indication identifying the first and second CSI-RS resources as a linked pair of CSI-RS resources for one or more SBFD symbols. In some other examples, the DCI may implicitly indicate that the first and second CSI-RS resources are a linked pair of CSI-RS resources for one or more SBFD symbols by triggering the first and second CSI-RS resources via the same DCI transmission. In some aspects, a plurality of linked CSI-RS resources that includes three of more CSI-RS resources (e.g., each in a respective downlink sub-band) may be indicated in L1 signaling (e.g., DCI) for triggering measurements of CSI-RSs in the plurality of linked CSI-RS resources. For example, the DCI may include an explicit indication identifying a plurality of CSI-RS resources as linked CSI-RS resources, or the DCI may implicitly indicate that a plurality of CSI-RS resources are linked CSI-RS resources for one or more SBFD symbols by triggering the plurality of CSI-RS resources via the same DCI transmission.

In some aspects, the linked pair of CSI-RS resources may include a pair of semi-persistent CSI-RS resources (e.g., the first and second CSI-RS resources may be semi-persistent CSI-RS resources), and the indication of the linked pair of CSI-RS resources may be included in layer 2 (L2) signaling for activating the semi-persistent CSI-RS resources. For example, the network node 110 may transmit, and the UE 120 may receive, a MAC-CE indicating activation of the first CSI-RS resource and the second CSI-RS resource, and the MAC-CE may include the indication of the linked pair of CSI-RS resources. In such examples, the UE 120 may have no knowledge of which CSI-RS resources are to be linked prior to receiving the MAC-CE. In some examples, the MAC-CE may include an explicit indication identifying the first and second CSI-RS resources as a linked pair of CSI-RS resources for one or more SBFD symbols. In some aspects, a plurality of linked CSI-RS resources that includes three of more CSI-RS resources (e.g., each in a respective downlink sub-band) may be indicated in L2 signaling (e.g., a MAC-CE) for activating semi-persistent CSI-RS resources. For example, the MAC-CE may include an explicit indication identifying a plurality of semi-persistent CSI-RS resources to be activated as linked CSI-RS resources.

In some aspects, the linked pair of CSI-RS resources (e.g., indicated in the CSI report configuration, the DCI, or the MAC-CE) may be associated with the same symbols and/or a same slot location. In examples in which the linked pair of CSI-RS resources are associated with the same slot, the linked pair of CSI-RS resources may be configured with the same periodicity and offset. Additionally or alternatively, the linked pair of CSI-RS resources may be associated with the same CSI-RS port configuration. For example, the linked pair of CSI-RS resources may be configured with the same number of ports and the same CDM type. Additionally or alternatively, the linked pair of CSI-RS resources may be associated with the same scrambling ID (e.g., a same sequence). Additionally or alternatively, the linked pair of CSI-RS resources may be associated with the same power offset. Additionally or alternatively, the linked pair of CSI-RS resources may be associated with RB density. For example, the density of RBs in each CSI-RS resource of the linked pair of CSI-RS resources may be 0.5 or 1. In some aspects, the linked pair of CSI-RS resources may be restricted (e.g., in accordance with a wireless communication standard, such as a 3GPP standard) to have one or more of the same symbol allocation, the same slot allocation (e.g., the same periodicity and offset), the same CSI-RS port configuration (e.g., the same number of ports and/or the same CDM type), the same scrambling ID (e.g., the same sequence), the same power offset, and/or the same RB density.

The two CSI-RS resources of the linked pair of CSI-RS resources may be configured on different downlink sub-bands. For example, the linked pair of CSI-RS resources may include the first CSI-RS resource on the first downlink sub-band and the second downlink CSI-RS resource on the second downlink sub-band. In some aspects, the first downlink sub-band and the second downlink sub-band may not overlap. For example, the linked pair of CSI-RS resources may be restricted (e.g., in association with a wireless communication standard, such as a 3GPP standard) to be configured on different downlink sub-bands with no overlap in the frequency domain resources of the linked pair of CSI-RS resources. In some aspects, the linked pair of CSI-RS resources may only be configured on SBFD symbols. For example, the UE 120 may not expect the linked pair of CSI-RS resources to be configured on non-SBFD symbols. In some aspects, the linked pair of CSI-RS resources may be configured with the same time domain behavior (e.g., aperiodic, semi-persistent, or periodic).

In some aspects, the linked pair of CSI-RS resources may be associated with different symbols or different slots. For example, the linked pair of CSI-RS resources may be permitted to be configured in different symbols in the same slot or in different slots in a frame. In some examples in which the linked pair of CSI-RS resources are configured in different symbols or slots, a timing requirement ($Z'$) associated with a CSI report computation time may be defined relative to a later-occurring (in time) CSI-RS resource of the linked pair of CSI-RS resources (e.g., the later-occurring one of the first CSI-RS and the second CSI-RS). In this way, the timing requirement ($Z'$) may ensure that the UE 120 has sufficient time to prepare the CSI report. In some examples in which the linked pair of CSI-RS resources are configured in different symbols or slots and the CSI report is a periodic or semi-persistent CSI report, in order to determine CPU occupation, CPUs may be allocated from a time of the occurrence of the latest-occurring (in time) CSI-RS resource used to calculate the CSI report. In such examples, the latest-occurring CSI-RS resource used to calculate the CSI report is the later-occurring CSI-RS resource of the linked pair of CSI-RS resources (e.g., the later-occurring one of the first CSI-RS and the second CSI-RS). In some examples in which the linked pair of CSI-RS resources are configured in different slots and the CSI report is periodic or semi-persistent, the CSI reference resource associated with the CSI report applies to each of the linked CSI-RS resources (e.g., each of the first CSI-RS and the second CSI-RS).

As further shown in FIG. 7, and by reference number 715, the network node 110 may transmit, and the UE 120 may receive, CSI-RSs in the linked pair of CSI-RS resources for SBFD symbols. For example, the network node 110 may transmit, and the UE 120 may receive, a first CSI-RS in the first CSI-RS resource on the first downlink sub-band and a second CSI-RS in the second CSI-RS resource on the second downlink sub-band.

In some aspects, the first and second CSI-RS resources may be periodic CSI-RS resources, and the first and second CSI-RSs may be periodic CSI-RSs. In some aspects, the first and second CSI-RS resources may be semi-persistent CSI- RS resources, and the first and second CSI-RSs may be semi-persistent CSI-RSs. In such examples, prior to transmitting the first and second CSI-RSs to the UE 120, the network node 110 may transmit, and the UE 120 may receive, a MAC-CE that indicates activation of the first and second CSI-RS resources. In some aspects, the first and second CSI-RS resources may be aperiodic CSI-RS resources, and the first and second CSI-RSs may be aperiodic CSI-RSs. In such examples, the reception and measurement of the first and second CSI-RSs may be triggered by DCI transmitted by the network node 110 and received by the UE 120. In some aspects, the linkage between two CSI-RS resources may be updated via a MAC-CE. For example, the network node 110 may transmit, and the UE 120 may receive, a MAC-CE that indicates an update to the linked pair of CSI-RS resources (e.g., a change from one linked pair of CSI-RS resources to another linked pair of CSI-RS resources).

The UE 120 may perform measurements (e.g., downlink channel measurements) of the first CSI-RS transmitted in the first CSI-RS resource and the second CSI-RS transmitted in the second CSI-RS resource. For example, the UE 120 may perform RSRP measurements of the first and second CSI-RSs and/or SINR measurements of the first and second CSI-RSs, among other examples.

In some examples, a CSI-RS of the CSI-RSs transmitted in the linked pair of CSI-RS resources may be dropped (e.g., the UE 120 may skip measuring the CSI-RS). For example, if a CSI-RS resource of the linked pair of CSI-RS resources is punctured and a quantity of remaining RBs in the CSI-RS resource does not satisfy (e.g., is less than) a threshold value (e.g., 24 RBs), the corresponding CSI-RS may be dropped (e.g., the UE 120 may skip measuring the CSI-RS). In some aspects, if the CSI-RS in one CSI-RS resource of the linked pair of CSI-RS resources is dropped for any reason, the UE 120 may not be required to measure the other CSI-RS in the other CSI-RS of the linked pair of CSI-RS resources. For example, if the first CSI-RS in the first CSI-RS resource is dropped, the UE 120 may skip performing the measurement of the second CSI-RS in the second CSI-RS resource in connection with the first CSI-RS being dropped. In some aspects, if the CSI-RS in one CSI-RS resource of the linked pair of CSI-RS resources is dropped, the UE 120 may still measure the CSI-RS in the other CSI-RS resource of the linked pair of CSI-RS resources. For example, if the first CSI-RS in the first CSI-RS resource is dropped, the UE 120 may perform the measurement of the second CSI-RS in the second CSI-RS resource in connection with the first CSI-RS being dropped. In some examples, the UE 120 may perform the measurement of the second CSI-RS in the second CSI-RS resource in connection with the first CSI-RS in the first CSI-RS resource being dropped, only if the first and second CSI-RS resources are semi-persistent or periodic CSI-RS resources. In some other examples, the UE 120 may perform the measurement of the second CSI-RS in the second CSI-RS resource in connection with the first CSI-RS in the first CSI-RS resource being dropped for aperiodic, semi-persistent, or periodic CSI-RS resources.

As further shown in FIG. 7, and by reference number 720, the UE 120 may transmit, and the network node 110 may receive, a CSI report including at least one CSI metric associated with the measurements of the CSI-RSs in the linked pair of CSI-RS resources. In some aspects, the UE 120 may determine one or more CSI metrics based on or otherwise associated with the measurements of the first CSI-RS in the first CSI-RS resource on the first downlink sub-band and the second CSI-RS in the second CSI-RS resource on the second downlink sub-band, and the UE 120 may include the one or more CSI metrics in the CSI report. For example, the one or more CSI metrics may include one or more of a CQI, a PMI, a CRI, an LI, an RI, and/or an RSRP, among other examples. In some aspects, the UE 120 may determine the one or more CSI metrics (e.g., CQI. PMI, CRI, LI, RI, and/or RSRP) based on or otherwise associated with a combination of the measurements of the CSI-RSs (e.g., the first CSI-RS and the second CSI-RS) in the linked pair of CSI-RS resources.

As indicated above, FIG. 7 is provided as an example. Other examples may differ from what is described with respect to FIG. 7.

FIG. 8 is a flowchart illustrating an example process 800 performed, for example, by a UE that supports linked SCI-RS resources for SBFD in accordance with the present disclosure. Example process 800 is an example where the UE (for example, UE 120) performs operations associated with linked CSI-RS resources for SBFD.

As shown in FIG. 8, in some aspects, process 800 may include receiving, from a network node, a CSI resource configuration (e.g., CSI-resourceConfig of FIG. 6B, FIG. 6C, or FIG. 6D) indicating a linked pair of CSI-RS resources for SBFD symbols, the linked pair of CSI-RS resources including a first CSI-RS resource (e.g., CSI-RS resource 510 of FIG. 5 and/or CSI-RS resource 1 of FIG. 6B, FIG. 6C, or FIG. 6D) on a first downlink sub-band and a second CSI-RS resource (e.g., CSI-RS resource 512 of FIG. 5 and/or CSI-RS resource 2 of FIG. 6B, FIG. 6C, or FIG. 6D) on a second downlink sub-band (block 810). For example, the UE (such as by using communication manager 140 or reception component 1202, depicted in FIG. 12) may receive, from a network node, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band, as described above (e.g., in connection with reference number 605 of FIG. 6A).

As further shown in FIG. 8, in some aspects, process 800 may include receiving, from the network node, a first CSI-RS (e.g., CSI-RS #1 of FIG. 5) in the first CSI-RS resource on the first downlink sub-band and a second CSI-RS (e.g., CSI-RS #2 of FIG. 5) in the second CSI-RS resource on the second downlink sub-band (block 820). For example, the UE (such as by using communication manager 140 or reception component 1202, depicted in FIG. 12) may receive, from the network node, a first CSI-RS in the first CSI-RS resource on the first downlink sub-band and a second CSI-RS in the second CSI-RS resource on the second downlink sub-band, as described above (e.g., in connection with reference number 610 of FIG. 6A).

As further shown in FIG. 8, in some aspects, process 800 may include transmitting, to the network node, a CSI report including at least one CSI metric associated with measurements of the first CSI-RS and the second CSI-RS (block 830). For example, the UE (such as by using communication manager 140 or transmission component 1204, depicted in FIG. 12) may transmit, to the network node, a CSI report including at least one CSI metric associated with measurements of the first CSI-RS and the second CSI-RS, as described above (e.g., in connection with reference number 615 of FIG. 6A).

Process 800 may include additional aspects, such as any single aspect or any combination of aspects described below or in connection with one or more other processes described elsewhere herein.

In a first additional aspect, the CSI resource configuration (e.g., CSI-resourceConfig of FIG. 6B) indicates a first CSI-RS resource set (e.g., CSI-RS set 1 of FIG. 6B) including the first CSI-RS resource (e.g., CSI-RS resource 1 of FIG. 6B) and a second CSI-RS resource set (e.g., CSI-RS resource set 1 of FIG. 6B) including the second CSI-RS resource (e.g., CSI-RS resource 2 of FIG. 6B).

In a second additional aspect, alone or in combination with the first aspect, the CSI resource configuration includes an indication of SBFD operation, and the CSI resource configuration indicates the first CSI-RS resource set and the second CSI-RS resource set in association with the CSI resource configuration including the indication of SBFD operation.

In a third additional aspect, alone or in combination with one or more of the first and second aspects, the CSI resource configuration (e.g., CSI-resourceConfig of FIG. 6C) indicates a CSI-RS resource set that includes a linked pairing indication (e.g., NZP-CSI-RS-pairing-SBFD-r19 of FIG. 6C) that indicates the linked pair of CSI-RS resources (e.g., CSI-RS resource 1 and CSI-RS resource 2 of FIG. 6C) for SBFD symbols.

In a fourth additional aspect, alone or in combination with one or more of the first through third aspects, the linked pairing indication indicates a first ID associated with the first CSI-RS resource and a second ID associated with the second CSI-RS resource.

In a fifth additional aspect, alone or in combination with one or more of the first through fourth aspects, the CSI resource configuration (e.g., CSI-resourceConfig of FIG. 6D) indicates a CSI-RS resource set (e.g., CSI-resource set 1 of FIG. 6D) including an indication of a primary CSI-RS resource (e.g., CSI-RS resource 1 of FIG. 6D) associated with the CSI report and an indication of a secondary CSI-RS resource (e.g., CSI-RS resource 2 of FIG. 6D) linked to the primary CSI-RS resource, and the primary CSI-RS resource is the first CSI-RS resource and the secondary CSI-RS resource is the second CSI-RS resource.

In a sixth additional aspect, alone or in combination with one or more of the first through fifth aspects, the indication of the secondary CSI-RS resource (e.g., CSI-RS resource 2 of FIG. 6D) includes a flag (e.g., Secondary_flag of FIG. 6D) indicating that the secondary CSI-RS resource is linked to the primary CSI-RS resource (e.g., CSI-resource set 1 of FIG. 6D) and an identifier (e.g., Primary resource ID of FIG. 6D) associated with the primary CSI-RS resource.

In a seventh additional aspect, alone or in combination with one or more of the first through sixth aspects, the linked pair of CSI-RSs are associated with a same one or more symbols or a same slot location.

In an eighth additional aspect, alone or in combination with one or more of the first through seventh aspects, the linked pair of CSI-RSs are associated with a same CSI-RS port configuration.

In a ninth additional aspect, alone or in combination with one or more of the first through eighth aspects, the linked pair of CSI-RSs are associated with a same scrambling identifier.

In a tenth additional aspect, alone or in combination with one or more of the first through ninth aspects, the linked pair of CSI-RSs are associated with a same power offset.

In an eleventh additional aspect, alone or in combination with one or more of the first through tenth aspects, the linked pair of CSI-RSs are associated with a same resource block density.

In a twelfth additional aspect, alone or in combination with one or more of the first through eleventh aspects, the first downlink sub-band does not overlap with the second downlink sub-band.

In a thirteenth additional aspect, alone or in combination with one or more of the first through twelfth aspects, the linked pair of CSI-RSs are both associated with a same time domain configuration that is indicated by the CSI resource configuration.

In a fourteenth additional aspect, alone or in combination with one or more of the first through thirteenth aspects, process 800 includes receiving a MAC-CE indicating an update to the linked pair of CSI-RSs.

In a fifteenth additional aspect, alone or in combination with one or more of the first through fourteenth aspects, the CSI resource configuration indicates a plurality of linked pairs of CSI-RS resources including the linked pair of CSI-RS resources, and the linked pair of CSI-RS resources can be activated from among the plurality of linked pairs of CSI-RS resources by a MAC-CE received at the UE.

In a sixteenth additional aspect, alone or in combination with one or more of the first through fifteenth aspects, process 800 includes skipping a measurement of the second CSI-RS in the second CSI-RS resource in connection with the first CSI-RS in the first CSI-RS resource being dropped.

In a seventeenth additional aspect, alone or in combination with one or more of the first through sixteenth aspects, process 800 includes performing a measurement of the second CSI-RS in the second CSI-RS resource in connection with the first CSI-RS in the first CSI-RS resource being dropped.

In an eighteenth additional aspect, alone or in combination with one or more of the first through seventeenth aspects, performing the measurement of the second CSI-RS in the second CSI-RS resource includes performing the measurement of the second CSI-RS in the second CSI-RS resource in connection with the first CSI-RS in the first CSI-RS resource being dropped and in association with the linked pair of CSI-RS resources being periodic or semi-persistent CSI-RS resources.

In a nineteenth additional aspect, alone or in combination with one or more of the first through eighteenth aspects, the linked pair of CSI-RS resources are associated with different symbols or different slots.

In a twentieth additional aspect, alone or in combination with one or more of the first through nineteenth aspects, a timing requirement associated with the CSI report is defined relative to a later-occurring one of the first CSI-RS resource or the second CSI-RS resource.

In a twenty-first additional aspect, alone or in combination with one or more of the first through twentieth aspects, the CSI report is a periodic or semi-persistent CSI report, and CSI processing units are allocated from a time of an occurrence of a later-occurring one of the first CSI-RS resource or the second CSI-RS resource.

In a twenty-second additional aspect, alone or in combination with one or more of the first through twenty-first aspects, the linked pair of CSI-RS resources are associated with different slots, the CSI report is a periodic or semi-persistent CSI report, and a CSI reference resource associated with the CSI report applies to the first CSI-RS resource and the second CSI-RS resource.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

FIG. 9 is a flowchart illustrating an example process 900 performed, for example, by a network node that supports linked CSI-RS resources for SBFD in accordance with the present disclosure. Example process 900 is an example where the network node (for example, network node 110) performs operations associated with linked CSI-RS resources for SBFD.

As shown in FIG. 9, in some aspects, process 900 may include transmitting, to a UE, a CSI resource configuration (e.g., CSI-resourceConfig of FIG. 6B, FIG. 6C, or FIG. 6D) indicating a linked pair of CSI-RS resources for SBFD symbols, the linked pair of CSI-RS resources including a first CSI-RS resource (e.g., CSI-RS resource 510 of FIG. 5 and/or CSI-RS resource 1 of FIG. 6B, FIG. 6C, or FIG. 6D) on a first downlink sub-band and a second CSI-RS resource (e.g., CSI-RS resource 512 of FIG. 5 and/or CSI-RS resource 2 of FIG. 6B, FIG. 6C, or FIG. 6D) on a second downlink sub-band (block 910). For example, the network node (such as by using communication manager 150 or transmission component 1304, depicted in FIG. 13) may transmit, to a UE, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band, as described above (e.g., in connection with reference number 605 of FIG. 6A).

As further shown in FIG. 9, in some aspects, process 900 may include transmitting, to the UE, a first CSI-RS (e.g., CSI-RS #1 of FIG. 5) in the first CSI-RS resource on the first downlink sub-band and a second CSI-RS (e.g., CSI-RS #2 of FIG. 5) in the second CSI-RS resource on the second downlink sub-band (block 920). For example, the network node (such as by using communication manager 150 or transmission component 1304, depicted in FIG. 13) may transmit, to the UE, a first CSI-RS in the first CSI-RS resource on the first downlink sub-band and a second CSI-RS in the second CSI-RS resource on the second downlink sub-band, as described above (e.g., in connection with reference number 610 of FIG. 6A).

As further shown in FIG. 9, in some aspects, process 900 may include receiving, from the UE, a CSI report including at least one CSI metric associated with measurements of the first CSI-RS and the second CSI-RS (block 930). For example, the network node (such as by using communication manager 150 or reception component 1302, depicted in FIG. 13) may receive, from the UE, a CSI report including at least one CSI metric associated with measurements of the first CSI-RS and the second CSI-RS, as described above (e.g., in connection with reference number 615 of FIG. 6A).

Process 900 may include additional aspects, such as any single aspect or any combination of aspects described below or in connection with one or more other processes described elsewhere herein.

In a first additional aspect, the CSI resource configuration (e.g., CSI-resourceConfig of FIG. 6B) indicates a first CSI-RS resource set (e.g., CSI-RS resource set 1 of FIG. 6B) including the first CSI-RS resource (e.g., CSI-RS resource 1 of FIG. 6B) and a second CSI-RS resource set (e.g., CSI-RS resource set 2 of FIG. 6B) including the second CSI-RS resource (e.g., CSI-RS resource 2 of FIG. 6B).

In a second additional aspect, alone or in combination with the first aspect, the CSI resource configuration includes an indication of SBFD operation, and the CSI resource configuration indicates the first CSI-RS resource set and the second CSI-RS resource set in association with the CSI resource configuration including the indication of SBFD operation.

In a third additional aspect, alone or in combination with one or more of the first and second aspects, the CSI resource configuration (e.g., CSI-resourceConfig of FIG. 6C) indicates a CSI-RS resource set (e.g., CSI-RS resource 1 of FIG. 6C) that includes a linked pairing indication (e.g., NZP-CSI-RS-pairing-SBFD-r19 of FIG. 6C) that indicates the linked pair of CSI-RS resources (e.g., CSI-RS resource 1 and CSI-RS resource 2 of FIG. 6C) for SBFD symbols.

In a fourth additional aspect, alone or in combination with one or more of the first through third aspects, the linked pairing indication indicates a first ID associated with the first CSI-RS resource and a second ID associated with the second CSI-RS resource.

In a fifth additional aspect, alone or in combination with one or more of the first through fourth aspects, the CSI resource configuration (e.g., CSI-resourceConfig of FIG. 6D) indicates a CSI-RS resource set (e.g., CSI-resource set 1 of FIG. 6D) including an indication of a primary CSI-RS resource (e.g., CSI-RS resource 1 of FIG. 6D) associated with the CSI report and an indication of a secondary CSI-RS resource (e.g., CSI-RS resource 2 of FIG. 6D) linked to the primary CSI-RS resource, and the primary CSI-RS resource is the first CSI-RS resource and the secondary CSI-RS resource is the second CSI-RS resource.

In a sixth additional aspect, alone or in combination with one or more of the first through fifth aspects, the indication of the secondary CSI-RS resource (e.g., CSI-RS resource 2 of FIG. 6D) includes a flag (e.g., Secondary_flag of FIG. 6D) indicating that the secondary CSI-RS resource is linked to the primary CSI-RS resource (e.g., CSI-RS resource 1 of FIG. 6D) and an identifier (e.g., Primary resource ID of FIG. 6D) associated with the primary CSI-RS resource.

In a seventh additional aspect, alone or in combination with one or more of the first through sixth aspects, the linked pair of CSI-RSs are associated with a same one or more symbols or a same slot location.

In an eighth additional aspect, alone or in combination with one or more of the first through seventh aspects, the linked pair of CSI-RSs are associated with a same CSI-RS port configuration.

In a ninth additional aspect, alone or in combination with one or more of the first through eighth aspects, the linked pair of CSI-RSs are associated with a same scrambling identifier.

In a tenth additional aspect, alone or in combination with one or more of the first through ninth aspects, the linked pair of CSI-RSs are associated with a same power offset.

In an eleventh additional aspect, alone or in combination with one or more of the first through tenth aspects, the linked pair of CSI-RSs are associated with a same resource block density.

In a twelfth additional aspect, alone or in combination with one or more of the first through eleventh aspects, the first downlink sub-band does not overlap with the second downlink sub-band.

In a thirteenth additional aspect, alone or in combination with one or more of the first through twelfth aspects, the linked pair of CSI-RSs are both associated with a same time domain configuration that is indicated by the CSI resource configuration.

In a fourteenth additional aspect, alone or in combination with one or more of the first through thirteenth aspects, process 900 includes transmitting, to the UE, a MAC-CE indicating an update to the linked pair of CSI-RSs.

In a fifteenth additional aspect, alone or in combination with one or more of the first through fourteenth aspects, the CSI resource configuration indicates a plurality of linked pairs of CSI-RS resources including the linked pair of CSI-RS resources, and the linked pair of CSI-RS resources can be activated from among the plurality of linked pairs of CSI-RS resources by a MAC-CE received at the UE.

In a sixteenth additional aspect, alone or in combination with one or more of the first through fifteenth aspects, the linked pair of CSI-RS resources are associated with different symbols or different slots.

In a seventeenth additional aspect, alone or in combination with one or more of the first through sixteenth aspects, a timing requirement associated with the CSI report is defined relative to a later-occurring one of the first CSI-RS resource or the second CSI-RS resource.

In an eighteenth additional aspect, alone or in combination with one or more of the first through seventeenth aspects, the CSI report is a periodic or semi-persistent CSI report, and CSI processing units are allocated from a time of an occurrence of a later-occurring one of the first CSI-RS resource or the second CSI-RS resource.

In a nineteenth additional aspect, alone or in combination with one or more of the first through eighteenth aspects, the linked pair of CSI-RS resources are associated with different slots, the CSI report is a periodic or semi-persistent CSI report, and a CSI reference resource associated with the CSI report applies to the first CSI-RS resource and the second CSI-RS resource.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

FIG. 10 is a flowchart illustrating an example process 1000 performed, for example, by a UE that supports linked CSI-RS resources for SBFD in accordance with the present disclosure. Example process 1000 is an example where the UE (for example, UE 120) performs operations associated with linked CSI-RS resources for SBFD.

As shown in FIG. 10, in some aspects, process 1000 may include receiving, from a network node, a first CSI resource configuration indicating a first CSI-RS resource and a second CSI resource configuration indicating a second CSI-RS resource (block 1010). For example, the UE (such as by using communication manager 140 or reception component 1202, depicted in FIG. 12) may receive, from a network node, a first CSI resource configuration indicating a first CSI-RS resource and a second CSI resource configuration indicating a second CSI-RS resource, as described above (e.g., in connection with reference number 705 of FIG. 7).

As further shown in FIG. 10, in some aspects, process 1000 may include receiving, from the network node, an indication of a linked pair of CSI-RS resources for one or more SBFD symbols, the linked pair of CSI-RS resources (e.g., CSI-RS resources 510 and 512 of FIG. 5) including the first CSI-RS resource and the second CSI-RS resource (block 1020). For example, the UE (such as by using communication manager 140 or reception component 1202, depicted in FIG. 12) may receive, from the network node, an indication of a linked pair of CSI-RS resources for one or more SBFD symbols, the linked pair of CSI-RS resources including the first CSI-RS resource and the second CSI-RS resource, as described above (e.g., in connection with reference number 710 of FIG. 7).

As further shown in FIG. 10, in some aspects, process 1000 may include receiving, from the network node, a first CSI-RS (e.g., CSI-RS #1 of FIG. 5) in the first CSI-RS resource and a second CSI-RS (e.g., CSI-RS #2 of FIG. 5) in the second CSI-RS resource (block 1030). For example, the UE (such as by using communication manager 140 or reception component 1202, depicted in FIG. 12) may receive, from the network node, a first CSI-RS in the first CSI-RS resource and a second CSI-RS in the second CSI-RS resource, as described above (e.g., in connection with reference number 715 of FIG. 7).

As further shown in FIG. 10, in some aspects, process 1000 may include transmitting, to the network node, a CSI report including at least one CSI metric associated with measurements of the first CSI-RS and the second CSI-RS (block 1040). For example, the UE (such as by using communication manager 140 or transmission component 1204, depicted in FIG. 12) may transmit, to the network node, a CSI report including at least one CSI metric associated with measurements of the first CSI-RS and the second CSI-RS, as described above (e.g., in connection with reference number 720 of FIG. 7).

Process 1000 may include additional aspects, such as any single aspect or any combination of aspects described below or in connection with one or more other processes described elsewhere herein.

In a first additional aspect, receiving the indication of the linked pair of CSI-RS resources includes receiving a CSI report configuration associated with the CSI report, the CSI report configuration including the indication of the linked pair of CSI-RS resources.

In a second additional aspect, alone or in combination with the first aspect, the first CSI-RS resource and the second CSI-RS resource are aperiodic CSI-RS resources, and receiving the indication of the linked pair of CSI-RS resources includes receiving DCI triggering measurements of the first CSI-RS in the first CSI-RS resource and the second CSI-RS in the second CSI-RS resource, the DCI including the indication of the linked pair of CSI-RS resources.

In a third additional aspect, alone or in combination with one or more of the first and second aspects, the first CSI-RS resource and the second CSI-RS resource are semi-persistent CSI-RS resources, and receiving the indication of the linked pair of CSI-RS resources includes receiving a MAC-CE indicating activation of the first CSI-RS resource and the second CSI-RS resource, the MAC-CE including the indication of the linked pair of CSI-RS resources.

In a fourth additional aspect, alone or in combination with one or more of the first through third aspects, the first CSI-RS resource is configured on a first downlink sub-band and the second CSI-RS resource is configured on a second downlink sub-band.

In a fifth additional aspect, alone or in combination with one or more of the first through fourth aspects, the linked pair of CSI-RSs are associated with a same one or more symbols or a same slot location.

In a sixth additional aspect, alone or in combination with one or more of the first through fifth aspects, the linked pair of CSI-RSs are associated with a same CSI-RS port configuration.

In a seventh additional aspect, alone or in combination with one or more of the first through sixth aspects, the linked pair of CSI-RSs are associated with a same scrambling identifier.

In an eighth additional aspect, alone or in combination with one or more of the first through seventh aspects, the linked pair of CSI-RSs are associated with a same power offset.

In a ninth additional aspect, alone or in combination with one or more of the first through eighth aspects, the linked pair of CSI-RSs are associated with a same resource block density.

In a tenth additional aspect, alone or in combination with one or more of the first through ninth aspects, the first downlink sub-band does not overlap with the second downlink sub-band.

In an eleventh additional aspect, alone or in combination with one or more of the first through tenth aspects, the linked pair of CSI-RSs are both associated with a same time domain configuration.

In a twelfth additional aspect, alone or in combination with one or more of the first through eleventh aspects, process 1000 includes receiving a MAC-CE indicating an update to the linked pair of CSI-RSs.

In a thirteenth additional aspect, alone or in combination with one or more of the first through twelfth aspects, process 1000 includes skipping a measurement of the second CSI-RS in the second CSI-RS resource in connection with the first CSI-RS in the first CSI-RS resource being dropped.

In a fourteenth additional aspect, alone or in combination with one or more of the first through thirteenth aspects, process 1000 includes performing a measurement of the second CSI-RS in the second CSI-RS resource in connection with the first CSI-RS in the first CSI-RS resource being dropped.

In a fifteenth additional aspect, alone or in combination with one or more of the first through fourteenth aspects, performing the measurement of the second CSI-RS in the second CSI-RS resource includes performing the measurement of the second CSI-RS in the second CSI-RS resource in connection with the first CSI-RS in the first CSI-RS resource being dropped and in association with the linked pair of CSI-RS resources being periodic or semi-persistent CSI-RS resources.

In a sixteenth additional aspect, alone or in combination with one or more of the first through fifteenth aspects, the linked pair of CSI-RS resources are associated with different symbols or different slots.

In a seventeenth additional aspect, alone or in combination with one or more of the first through sixteenth aspects, a timing requirement associated with the CSI report is defined relative to a later-occurring one of the first CSI-RS resource or the second CSI-RS resource.

In an eighteenth additional aspect, alone or in combination with one or more of the first through seventeenth aspects, the CSI report is a periodic or semi-persistent CSI report, and CSI processing units are allocated from a time of an occurrence of a later-occurring one of the first CSI-RS resource or the second CSI-RS resource.

In a nineteenth additional aspect, alone or in combination with one or more of the first through eighteenth aspects, the linked pair of CSI-RS resources are associated with different slots, the CSI report is a periodic or semi-persistent CSI report, and a CSI reference resource associated with the CSI report applies to the first CSI-RS resource and the second CSI-RS resource.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

FIG. 11 is a flowchart illustrating an example process 1100 performed, for example, by a network node that supports linked CSI-RS resources for SBFD in accordance with the present disclosure. Example process 1100 is an example where the network node (for example, network node 110) performs operations associated with linked CSI-RS resources for SBFD.

As shown in FIG. 11, in some aspects, process 1100 may include transmitting, to a UE, a first CSI resource configuration indicating a first CSI-RS resource and a second CSI resource configuration indicating a second CSI-RS resource (block 1110). For example, the network node (such as by using communication manager 150 or transmission component 1304, depicted in FIG. 13) may transmit, to a UE, a first CSI resource configuration indicating a first CSI-RS resource and a second CSI resource configuration indicating a second CSI-RS resource, as described above (e.g., in connection with reference number 705 of FIG. 7).

As further shown in FIG. 11, in some aspects, process 1100 may include transmitting, to the UE, an indication of a linked pair of CSI-RS resources (e.g., CSI-RS resources 510 and 512 of FIG. 5) for one or more SBFD symbols, the linked pair of CSI-RS resources including the first CSI-RS resource and the second CSI-RS resource (block 1120). For example, the network node (such as by using communication manager 150 or transmission component 1304, depicted in FIG. 13) may transmit, to the UE, an indication of a linked pair of CSI-RS resources for one or more SBFD symbols, the linked pair of CSI-RS resources including the first CSI-RS resource and the second CSI-RS resource, as described above (e.g., in connection with reference number 710 of FIG. 7).

As further shown in FIG. 11, in some aspects, process 1100 may include transmitting, to the UE, a first CSI-RS (e.g., CSI-RS #1 of FIG. 5) in the first CSI-RS resource and a second CSI-RS (e.g., CSI-RS #2 of FIG. 5) in the second CSI-RS resource (block 1130). For example, the network node (such as by using communication manager 150 or transmission component 1304, depicted in FIG. 13) may transmit, to the UE, a first CSI-RS in the first CSI-RS resource and a second CSI-RS in the second CSI-RS resource, as described above (e.g., in connection with reference number 715 of FIG. 7).

As further shown in FIG. 11, in some aspects, process 1100 may include receiving, from the UE, a CSI report including at least one CSI metric associated with measurements of the first CSI-RS and the second CSI-RS (block 1140). For example, the network node (such as by using communication manager 150 or reception component 1302, depicted in FIG. 13) may receive, from the UE, a CSI report including at least one CSI metric associated with measurements of the first CSI-RS and the second CSI-RS, as described above (e.g., in connection with reference number 720 of FIG. 7).

Process 1100 may include additional aspects, such as any single aspect or any combination of aspects described below or in connection with one or more other processes described elsewhere herein.

In a first additional aspect, transmitting the indication of the linked pair of CSI-RS resources includes transmitting a CSI report configuration associated with the CSI report, the CSI report configuration including the indication of the linked pair of CSI-RS resources.

In a second additional aspect, alone or in combination with the first aspect, the first CSI-RS resource and the second CSI-RS resource are aperiodic CSI-RS resources, and transmitting the indication of the linked pair of CSI-RS resources includes transmitting DCI triggering measurements of the first CSI-RS in the first CSI-RS resource and the second CSI-RS in the second CSI-RS resource, the DCI including the indication of the linked pair of CSI-RS resources.

In a third additional aspect, alone or in combination with one or more of the first and second aspects, the first CSI-RS resource and the second CSI-RS resource are semi-persistent CSI-RS resources, and transmitting the indication of the linked pair of CSI-RS resources includes transmitting a MAC-CE indicating activation of the first CSI-RS resource and the second CSI-RS resource, the MAC-CE including the indication of the linked pair of CSI-RS resources.

In a fourth additional aspect, alone or in combination with one or more of the first through third aspects, the first CSI-RS resource is configured on a first downlink sub-band and the second CSI-RS resource is configured on a second downlink sub-band.

In a fifth additional aspect, alone or in combination with one or more of the first through fourth aspects, the linked pair of CSI-RSs are associated with a same one or more symbols or a same slot location.

In a sixth additional aspect, alone or in combination with one or more of the first through fifth aspects, the linked pair of CSI-RSs are associated with a same CSI-RS port configuration.

In a seventh additional aspect, alone or in combination with one or more of the first through sixth aspects, the linked pair of CSI-RSs are associated with a same scrambling identifier.

In an eighth additional aspect, alone or in combination with one or more of the first through seventh aspects, the linked pair of CSI-RSs are associated with a same power offset.

In a ninth additional aspect, alone or in combination with one or more of the first through eighth aspects, the linked pair of CSI-RSs are associated with a same resource block density.

In a tenth additional aspect, alone or in combination with one or more of the first through ninth aspects, the first downlink sub-band does not overlap with the second downlink sub-band.

In an eleventh additional aspect, alone or in combination with one or more of the first through tenth aspects, the linked pair of CSI-RSs are both associated with a same time domain configuration.

In a twelfth additional aspect, alone or in combination with one or more of the first through eleventh aspects, process 1100 includes transmitting a MAC-CE indicating an update to the linked pair of CSI-RSs.

In a thirteenth additional aspect, alone or in combination with one or more of the first through twelfth aspects, the linked pair of CSI-RS resources are associated with different symbols or different slots.

In a fourteenth additional aspect, alone or in combination with one or more of the first through thirteenth aspects, a timing requirement associated with the CSI report is defined relative to a later-occurring one of the first CSI-RS resource or the second CSI-RS resource.

In a fifteenth additional aspect, alone or in combination with one or more of the first through fourteenth aspects, the CSI report is a periodic or semi-persistent CSI report, and CSI processing units are allocated from a time of an occurrence of a later-occurring one of the first CSI-RS resource or the second CSI-RS resource.

In a sixteenth additional aspect, alone or in combination with one or more of the first through fifteenth aspects, the linked pair of CSI-RS resources are associated with different slots, the CSI report is a periodic or semi-persistent CSI report, and a CSI reference resource associated with the CSI report applies to the first CSI-RS resource and the second CSI-RS resource.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
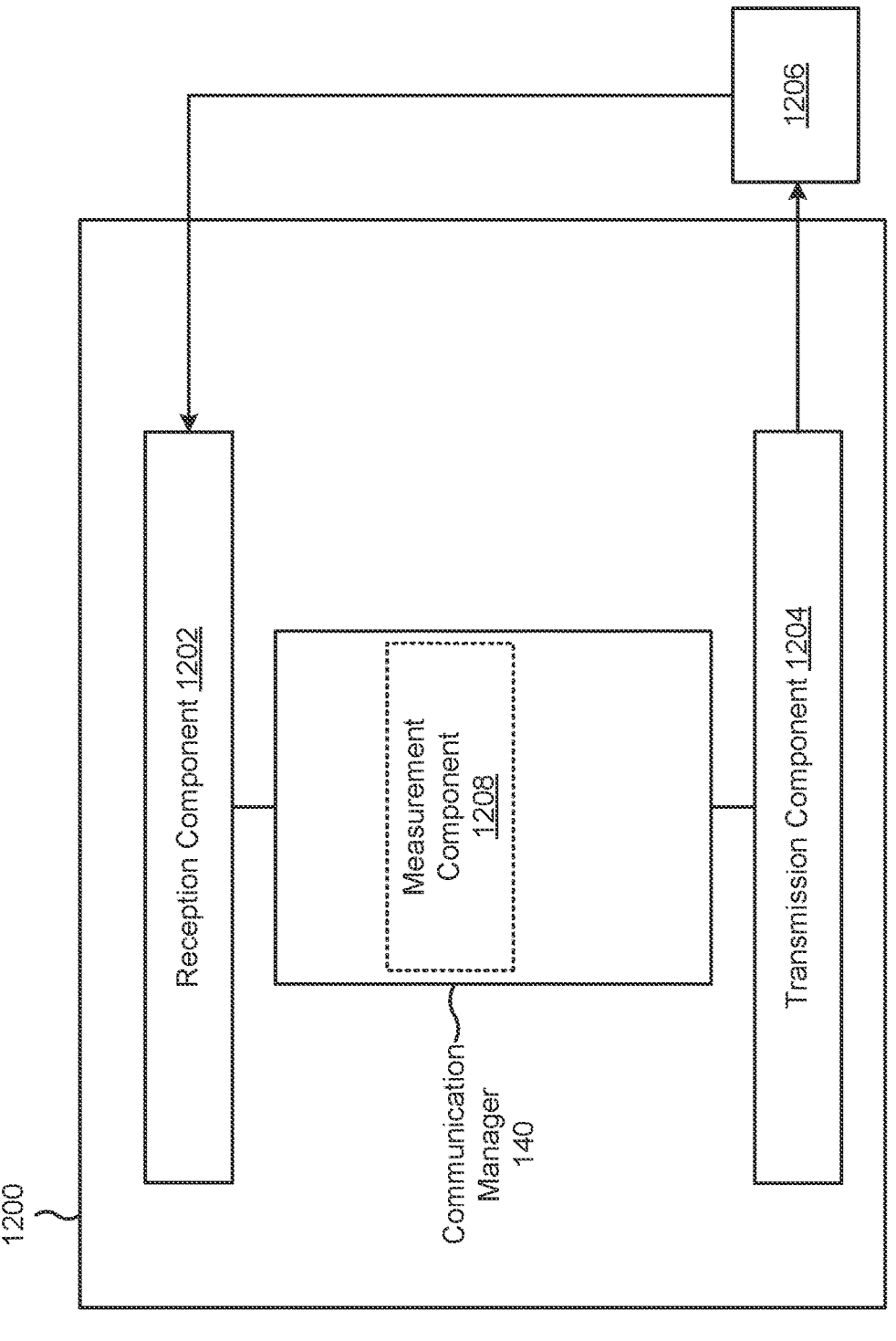
FIGS. 12-13 are diagrams of example apparatuses for wireless communication that support linked CSI-RS resources for SBFD in accordance with the present disclosure.

FIG. 12 is a diagram of an example apparatus 1200 for wireless communication that supports linked CSI-RS resources for SBFD in accordance with the present disclosure. The apparatus 1200 may be a UE, or a UE may include the apparatus 1200. In some aspects, the apparatus 1200 includes a reception component 1202, a transmission component 1204, and a communication manager 140, which may be in communication with one another (for example, via one or more buses). As shown, the apparatus 1200 may communicate with another apparatus 1206 (such as a UE, a network node, or another wireless communication device) using the reception component 1202 and the transmission component 1204.

In some aspects, the apparatus 1200 may be configured to and/or operable to perform one or more operations described herein in connection with FIGS. 5, 6A-6D, and 7. Additionally or alternatively, the apparatus 1200 may be configured to and/or operable to perform one or more processes described herein, such as process 800 of FIG. 8, and/or process 1000 of FIG. 10. In some aspects, the apparatus 1200 may include one or more components of the UE described above in connection with FIG. 2.

The reception component 1202 may receive communications, such as reference signals, control information, and/or data communications, from the apparatus 1206. The reception component 1202 may provide received communications to one or more other components of the apparatus 1200, such as the communication manager 140. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a modem, a demodulator, a MIMO detector, a receive processor, a controller/processor, and/or a memory of the UE described above in connection with FIG. 2.

The transmission component 1204 may transmit communications, such as reference signals, control information, and/or data communications, to the apparatus 1206. In some aspects, the communication manager 140 may generate communications and may transmit the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, and/or a memory of the UE described above in connection with FIG. 2. In some aspects, the transmission component 1204 may be co-located with the reception component 1202 in a transceiver.

In some aspects, the communication manager 140 may receive or may cause the reception component 1202 to receive, from a network node, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band. The communication manager 140 may receive or may cause the reception component 1202 to receive, from the network node, a first CSI-RS in the first CSI-RS resource on the first downlink sub-band and a second CSI-RS in the second CSI-RS resource on the second downlink sub-band. The communication manager 140 may transmit or may cause the transmission component 1204 to transmit, to the network node, a CSI report including at least one CSI metric associated with measurements of the first CSI-RS and the second CSI-RS.

In some aspects, the communication manager 140 may receive or may cause the reception component 1202 to receive, from a network node, a first CSI resource configuration indicating a first CSI-RS resource and a second CSI resource configuration indicating a second CSI-RS resource. The communication manager 140 may receive or may cause the reception component 1202 to receive, from the network node, an indication of a linked pair of CSI-RS resources for one or more SBFD symbols, the linked pair of CSI-RS resources including the first CSI-RS resource and the second CSI-RS resource. The communication manager 140 may receive or may cause the reception component 1202 to receive, from the network node, a first CSI-RS in the first CSI-RS resource and a second CSI-RS in the second CSI-RS resource. The communication manager 140 may transmit or may cause the transmission component 1204 to transmit, to the network node, a CSI report including at least one CSI metric associated with measurements of the first CSI-RS and the second CSI-RS. In some aspects, the communication manager 140 may perform one or more operations described elsewhere herein as being performed by one or more components of the communication manager 140.

The communication manager 140 may include a controller/processor and/or a memory of the UE described above in connection with FIG. 2. In some aspects, the communication manager 140 includes a set of components, such as a measurement component 1208. Alternatively, the set of components may be separate and distinct from the communication manager 140. In some aspects, one or more components of the set of components may include or may be implemented within a controller/processor and/or a memory of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the reception component 1202 may receive, from a network node, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band. The reception component 1202 may receive, from the network node, a first CSI-RS in the first CSI-RS resource on the first downlink sub-band and a second CSI-RS in the second CSI-RS resource on the second downlink sub-band. The transmission component 1204 may transmit, to the network node, a CSI report including at least one CSI metric associated with measurements of the first CSI-RS and the second CSI-RS.

The measurement component 1208 may perform the measurements of the first CSI-RS and the second CSI-RS.

The reception component 1202 may receive a MAC-CE indicating an update to the linked pair of CSI-RSs.

The communication manager 140 may skip a measurement of the second CSI-RS in the second CSI-RS resource in connection with the first CSI-RS in the first CSI-RS resource being dropped.

The measurement component 1208 may perform a measurement of the second CSI-RS in the second CSI-RS resource in connection with the first CSI-RS in the first CSI-RS resource being dropped.

In some aspects, the reception component 1202 may receive, from a network node, a first CSI resource configuration indicating a first CSI-RS resource and a second CSI resource configuration indicating a second CSI-RS resource. The reception component 1202 may receive, from the network node, an indication of a linked pair of CSI-RS resources for one or more SBFD symbols, the linked pair of CSI-RS resources including the first CSI-RS resource and the second CSI-RS resource. The reception component 1202 may receive, from the network node, a first CSI-RS in the first CSI-RS resource and a second CSI-RS in the second CSI-RS resource. The transmission component 1204 may transmit, to the network node, a CSI report including at least one CSI metric associated with measurements of the first CSI-RS and the second CSI-RS.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
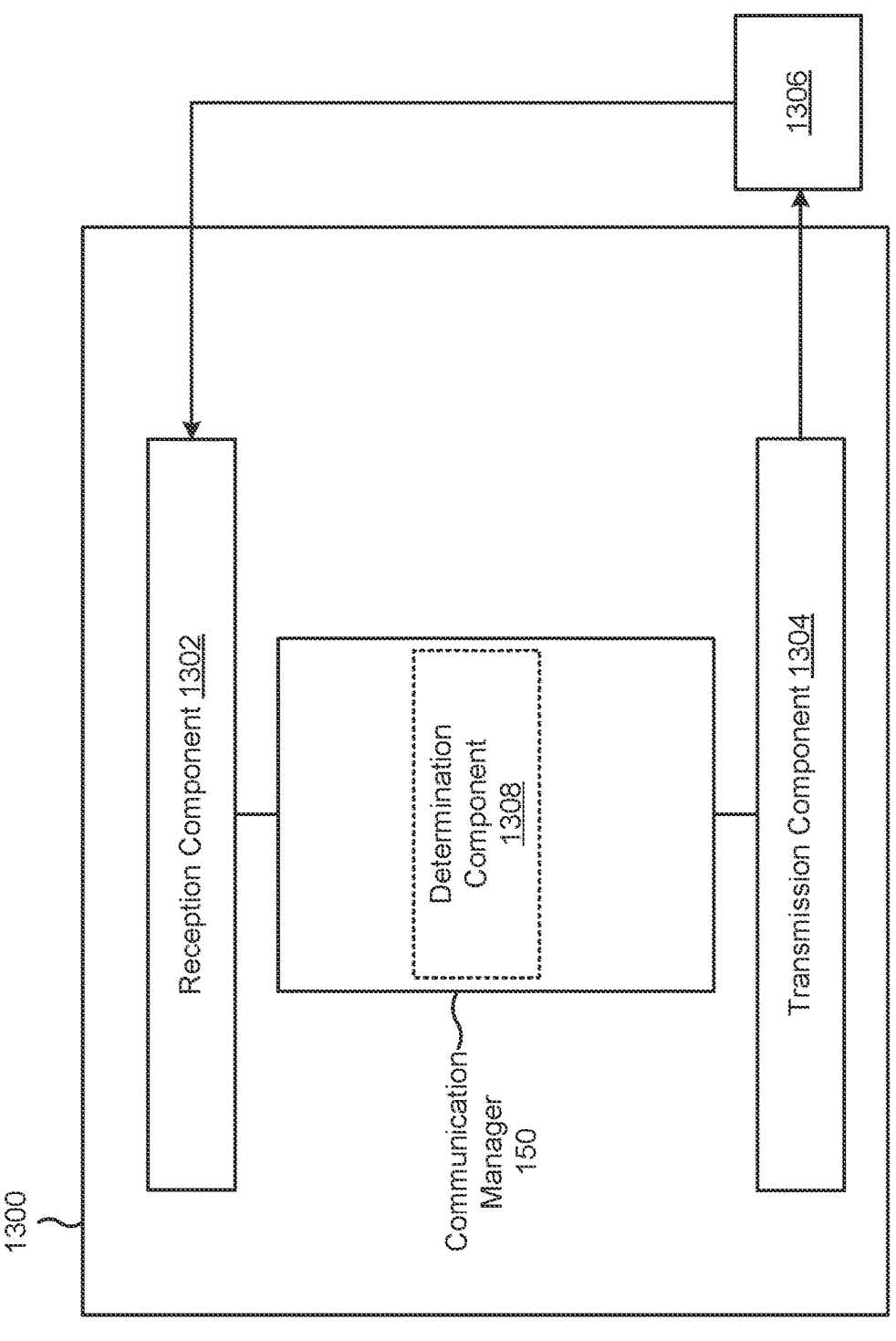

FIG. 13 is a diagram of an example apparatus 1300 for wireless communication that supports linked CSI-RS resources for SBFD in accordance with the present disclosure. The apparatus 1300 may be a network node, or a network node may include the apparatus 1300. In some aspects, the apparatus 1300 includes a reception component 1302, a transmission component 1304, and a communication manager 150, which may be in communication with one another (for example, via one or more buses). As shown, the apparatus 1300 may communicate with another apparatus 1306 (such as a UE, a network node, or another wireless communication device) using the reception component 1302 and the transmission component 1304.

In some aspects, the apparatus 1300 may be configured to and/or operable to perform one or more operations described herein in connection with FIGS. 5, 6A-6D, and 7. Additionally or alternatively, the apparatus 1300 may be configured to and/or operable to perform one or more processes described herein, such as process 900 of FIG. 9, and/or process 1100 of FIG. 11. In some aspects, the apparatus 1300 may include one or more components of the network node described above in connection with FIG. 2.

The reception component 1302 may receive communications, such as reference signals, control information, and/or data communications, from the apparatus 1306. The reception component 1302 may provide received communications to one or more other components of the apparatus 1300, such as the communication manager 150. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a modem, a demodulator, a MIMO detector, a receive processor, a controller/processor, and/or a memory of the network node described above in connection with FIG. 2.

The transmission component 1304 may transmit communications, such as reference signals, control information, and/or data communications, to the apparatus 1306. In some aspects, the communication manager 150 may generate communications and may transmit the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, and/or a memory of the network node described above in connection with FIG. 2. In some aspects, the transmission component 1304 may be co-located with the reception component 1302 in a transceiver.

In some aspects, the communication manager 150 may transmit or may cause the transmission component 1304 to transmit, to a UE, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band. The communication manager 150 may transmit or may cause the transmission component 1304 to transmit, to the UE, a first CSI-RS in the first CSI-RS resource on the first downlink sub-band and a second CSI-RS in the second CSI-RS resource on the second downlink sub-band. The communication manager 150 may receive or may cause the reception component 1302 to receive, from the UE, a CSI report including at least one CSI metric associated with measurements of the first CSI-RS and the second CSI-RS.

In some aspects, the communication manager 150 may transmit or may cause the transmission component 1304 to transmit, to a UE, a first CSI resource configuration indicating a first CSI-RS resource and a second CSI resource configuration indicating a second CSI-RS resource. The communication manager 150 may transmit or may cause the transmission component 1304 to transmit, to the UE, an indication of a linked pair of CSI-RS resources for one or more SBFD symbols, the linked pair of CSI-RS resources including the first CSI-RS resource and the second CSI-RS resource. The communication manager 150 may transmit or may cause the transmission component 1304 to transmit, to the UE, a first CSI-RS in the first CSI-RS resource and a second CSI-RS in the second CSI-RS resource. The communication manager 150 may receive or may cause the reception component 1302 to receive, from the UE, a CSI report including at least one CSI metric associated with measurements of the first CSI-RS and the second CSI-RS. In some aspects, the communication manager 150 may perform one or more operations described elsewhere herein as being performed by one or more components of the communication manager 150.

The communication manager 150 may include a controller/processor, a memory, a scheduler, and/or a communication unit of the network node described above in connection with FIG. 2. In some aspects, the communication manager 150 includes a set of components, such as a determination component 1308. Alternatively, the set of components may be separate and distinct from the communication manager 150. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the transmission component 1304 may transmit, to a UE, a CSI resource configuration indicating a linked pair of CSI-RS resources for SBFD symbols, the linked pair of CSI-RS resources including a first CSI-RS resource on a first downlink sub-band and a second CSI-RS resource on a second downlink sub-band. The transmission component 1304 may transmit, to the UE, a first CSI-RS in the first CSI-RS resource on the first downlink sub-band and a second CSI-RS in the second CSI-RS resource on the second downlink sub-band. The reception component 1302 may receive, from the UE, a CSI report including at least one CSI metric associated with measurements of the first CSI-RS and the second CSI-RS.

The determination component 1308 may determine the linked pair of CSI-RS resources.

The transmission component 1304 may transmit, to the UE, a MAC-CE indicating an update to the linked pair of CSI-RSs.

In some aspects, the transmission component 1304 may transmit, to a UE, a first CSI resource configuration indicating a first CSI-RS resource and a second CSI resource configuration indicating a second CSI-RS resource. The transmission component 1304 may transmit, to the UE, an indication of a linked pair of CSI-RS resources for one or more SBFD symbols, the linked pair of CSI-RS resources including the first CSI-RS resource and the second CSI-RS resource. The transmission component 1304 may transmit, to the UE, a first CSI-RS in the first CSI-RS resource and a second CSI-RS in the second CSI-RS resource. The reception component 1302 may receive, from the UE, a CSI report including at least one CSI metric associated with measurements of the first CSI-RS and the second CSI-RS.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed at a user equipment (UE), comprising: receiving, from a network node, a channel state information (CSI) resource configuration indicating a linked pair of CSI reference signal (CSI-RS) resources for sub-band full duplex (SBFD) symbols, the linked pair of CSI-RS resources including a first CSI-RS resource on a first downlink sub-band and a second CSI-RS resource on a second downlink sub-band; receiving, from the network node, a first CSI-RS in the first CSI-RS resource on the first downlink sub-band and a second CSI-RS in the second CSI-RS resource on the second downlink sub-band; and transmitting, to the network node, a CSI report including at least one CSI metric associated with measurements of the first CSI-RS and the second CSI-RS.

Aspect 2: The method of Aspect 1, wherein the CSI resource configuration indicates a first CSI-RS resource set including the first CSI-RS resource and a second CSI-RS resource set including the second CSI-RS resource.

Aspect 3: The method of Aspect 2, wherein the CSI resource configuration includes an indication of SBFD operation, and wherein the CSI resource configuration indicates the first CSI-RS resource set and the second CSI-RS resource set in association with the CSI resource configuration including the indication of SBFD operation.

Aspect 4: The method of Aspect 1, wherein the CSI resource configuration indicates a CSI-RS resource set that includes a linked pairing indication that indicates the linked pair of CSI-RS resources for SBFD symbols.

Aspect 5: The method of Aspect 4, wherein the linked pairing indication indicates a first identifier (ID) associated with the first CSI-RS resource and a second ID associated with the second CSI-RS resource.

Aspect 6: The method of any of Aspect 1, wherein the CSI resource configuration indicates a CSI-RS resource set including an indication of a primary CSI-RS resource associated with the CSI report and an indication of a secondary CSI-RS resource linked to the primary CSI-RS resource, and wherein the primary CSI-RS resource is the first CSI-RS resource and the secondary CSI-RS resource is the second CSI-RS resource.

Aspect 7: The method of Aspect 6, wherein the indication of the secondary CSI-RS resource includes a flag indicating that the secondary CSI-RS resource is linked to the primary CSI-RS resource and an identifier associated with the primary CSI-RS resource.

Aspect 8: The method of any of Aspects 1-7, wherein the linked pair of CSI-RSs are associated with a same one or more symbols or a same slot location.

Aspect 9: The method of any of Aspects 1-8, wherein the linked pair of CSI-RSs are associated with a same CSI-RS port configuration.

Aspect 10: The method of any of Aspects 1-9, wherein the linked pair of CSI-RSs are associated with a same scrambling identifier.

Aspect 11: The method of any of Aspects 1-10, wherein the linked pair of CSI-RSs are associated with a same power offset.

Aspect 12: The method of any of Aspects 1-11, wherein the linked pair of CSI-RSs are associated with a same resource block density.

Aspect 13: The method of any of Aspects 1-12, wherein the first downlink sub-band does not overlap with the second downlink sub-band.

Aspect 14: The method of any of Aspects 1-13, wherein the linked pair of CSI-RSs are both associated with a same time domain configuration that is indicated by the CSI resource configuration.

Aspect 15: The method of any of Aspects 1-14, further comprising: receiving a medium access control (MAC) control element (MAC-CE) indicating an update to the linked pair of CSI-RSs.

Aspect 16: The method of any of Aspects 1-15, wherein the CSI resource configuration indicates a plurality of linked pairs of CSI-RS resources including the linked pair of CSI-RS resources, and wherein the linked pair of CSI-RS resources can be activated from among the plurality of linked pairs of CSI-RS resources by a medium access control (MAC) control element (MAC-CE) received at the UE.

Aspect 17: The method of any of Aspects 1-16, further comprising: skipping a measurement of the second CSI-RS in the second CSI-RS resource in connection with the first CSI-RS in the first CSI-RS resource being dropped.

Aspect 18: The method of any of Aspects 1-16, further comprising: performing a measurement of the second CSI-RS in the second CSI-RS resource in connection with the first CSI-RS in the first CSI-RS resource being dropped.

Aspect 19: The method of Aspect 18, wherein performing the measurement of the second CSI-RS in the second CSI-RS resource comprises: performing the measurement of the second CSI-RS in the second CSI-RS resource in connection with the first CSI-RS in the first CSI-RS resource being dropped and in association with the linked pair of CSI-RS resources being periodic or semi-persistent CSI-RS resources.

Aspect 20: The method of any of Aspects 1-19, wherein the linked pair of CSI-RS resources are associated with different symbols or different slots.

Aspect 21: The method of Aspect 20, wherein a timing requirement associated with the CSI report is defined relative to a later-occurring one of the first CSI-RS resource or the second CSI-RS resource.

Aspect 22: The method of any of Aspects 20-21, wherein the CSI report is a periodic or semi-persistent CSI report, and wherein CSI processing units are allocated from a time of an occurrence of a later-occurring one of the first CSI-RS resource or the second CSI-RS resource.

Aspect 23: The method of any of Aspects 20-22, wherein the linked pair of CSI-RS resources are associated with different slots, wherein the CSI report is a periodic or semi-persistent CSI report, and wherein a CSI reference resource associated with the CSI report applies to the first CSI-RS resource and the second CSI-RS resource.

Aspect 24: A method of wireless communication performed at a network node, comprising: transmitting, to a user equipment (UE), a channel state information (CSI) resource configuration indicating a linked pair of CSI reference signal (CSI-RS) resources for sub-band full duplex (SBFD) symbols, the linked pair of CSI-RS resources including a first CSI-RS resource on a first downlink sub-band and a second CSI-RS resource on a second downlink sub-band; transmitting, to the UE, a first CSI-RS in the first CSI-RS resource on the first downlink sub-band and a second CSI-RS in the second CSI-RS resource on the second downlink sub-band; and receiving, from the UE, a CSI report including at least one CSI metric associated with measurements of the first CSI-RS and the second CSI-RS.

Aspect 25: The method of Aspect 24, wherein the CSI resource configuration indicates a first CSI-RS resource set including the first CSI-RS resource and a second CSI-RS resource set including the second CSI-RS resource.

Aspect 26: The method of Aspect 25, wherein the CSI resource configuration includes an indication of SBFD operation, and wherein the CSI resource configuration indicates the first CSI-RS resource set and the second CSI-RS resource set in association with the CSI resource configuration including the indication of SBFD operation.

Aspect 27: The method of Aspect 24, wherein the CSI resource configuration indicates a CSI-RS resource set that includes a linked pairing indication that indicates the linked pair of CSI-RS resources for SBFD symbols.

Aspect 28: The method of Aspect 27, wherein the linked pairing indication indicates a first identifier (ID) associated with the first CSI-RS resource and a second ID associated with the second CSI-RS resource.

Aspect 29: The method of Aspect 24, wherein the CSI resource configuration indicates a CSI-RS resource set including an indication of a primary CSI-RS resource associated with the CSI report and an indication of a secondary CSI-RS resource linked to the primary CSI-RS resource, and wherein the primary CSI-RS resource is the first CSI-RS resource and the secondary CSI-RS resource is the second CSI-RS resource.

Aspect 30: The method of Aspect 29, wherein the indication of the secondary CSI-RS resource includes a flag indicating that the secondary CSI-RS resource is linked to the primary CSI-RS resource and an identifier associated with the primary CSI-RS resource.

Aspect 31: The method of any of Aspects 24-30, wherein the linked pair of CSI-RSs are associated with a same one or more symbols or a same slot location.

Aspect 32: The method of any of Aspects 24-31, wherein the linked pair of CSI-RSs are associated with a same CSI-RS port configuration.

Aspect 33: The method of any of Aspects 24-32, wherein the linked pair of CSI-RSs are associated with a same scrambling identifier.

Aspect 34: The method of any of Aspects 24-33, wherein the linked pair of CSI-RSs are associated with a same power offset.

Aspect 35: The method of any of Aspects 24-34, wherein the linked pair of CSI-RSs are associated with a same resource block density.

Aspect 36: The method of any of Aspects 24-35, wherein the first downlink sub-band does not overlap with the second downlink sub-band.

Aspect 37: The method of any of Aspects 24-36, wherein the linked pair of CSI-RSs are both associated with a same time domain configuration that is indicated by the CSI resource configuration.

Aspect 38: The method of any of Aspects 24-37, further comprising: transmitting, to the UE, a medium access control (MAC) control element (MAC-CE) indicating an update to the linked pair of CSI-RSs.

Aspect 39: The method of any of Aspects 24-38, wherein the CSI resource configuration indicates a plurality of linked pairs of CSI-RS resources including the linked pair of CSI-RS resources, and wherein the linked pair of CSI-RS resources can be activated from among the plurality of linked pairs of CSI-RS resources by a medium access control (MAC) control element (MAC-CE) transmitted to the UE.

Aspect 40: The method of any of Aspects 24-39, wherein the linked pair of CSI-RS resources are associated with different symbols or different slots.

Aspect 41: The method of Aspect 40, wherein a timing requirement associated with the CSI report is defined relative to a later-occurring one of the first CSI-RS resource or the second CSI-RS resource.

Aspect 42: The method of any of Aspects 40-41, wherein the CSI report is a periodic or semi-persistent CSI report, and wherein CSI processing units are allocated from a time of an occurrence of a later-occurring one of the first CSI-RS resource or the second CSI-RS resource.

Aspect 43: The method of any of Aspects 40-42, wherein the linked pair of CSI-RS resources are associated with different slots, wherein the CSI report is a periodic or semi-persistent CSI report, and wherein a CSI reference resource associated with the CSI report applies to the first CSI-RS resource and the second CSI-RS resource.

Aspect 44: A method of wireless communication performed at a user equipment (UE), comprising: receiving, from a network node, a first channel state information (CSI) resource configuration indicating a first CSI reference signal (CSI-RS) resource and a second CSI resource configuration indicating a second CSI-RS resource; receiving, from the network node, an indication of a linked pair of CSI-RS resources for one or more sub-band full duplex (SBFD) symbols, the linked pair of CSI-RS resources including the first CSI-RS resource and the second CSI-RS resource; receiving, from the network node, a first CSI-RS in the first CSI-RS resource and a second CSI-RS in the second CSI-RS resource; and transmitting, to the network node, a CSI report including at least one CSI metric associated with measurements of the first CSI-RS and the second CSI-RS.

Aspect 45: The method of Aspect 44, wherein receiving the indication of the linked pair of CSI-RS resources comprises: receiving a CSI report configuration associated with the CSI report, the CSI report configuration including the indication of the linked pair of CSI-RS resources.

Aspect 46: The method of Aspect 44, wherein the first CSI-RS resource and the second CSI-RS resource are aperiodic CSI-RS resources, and wherein receiving the indication of the linked pair of CSI-RS resources comprises: receiving downlink control information (DCI) triggering measurements of the first CSI-RS in the first CSI-RS resource and the second CSI-RS in the second CSI-RS resource, the DCI including the indication of the linked pair of CSI-RS resources.

Aspect 47: The method of Aspect 44, wherein the first CSI-RS resource and the second CSI-RS resource are semi-persistent CSI-RS resources, and wherein receiving the indication of the linked pair of CSI-RS resources comprises: receiving a medium access control (MAC) control element (MAC-CE) indicating activation of the first CSI-RS resource and the second CSI-RS resource, the MAC-CE including the indication of the linked pair of CSI-RS resources.

Aspect 48: The method of any of Aspects 44-47, wherein the first CSI-RS resource is configured on a first downlink sub-band and the second CSI-RS resource is configured on a second downlink sub-band.

Aspect 49: The method of any of Aspects 44-48, wherein the linked pair of CSI-RSs are associated with a same one or more symbols or a same slot location.

Aspect 50: The method of any of Aspects 44-49, wherein the linked pair of CSI-RSs are associated with a same CSI-RS port configuration.

Aspect 51: The method of any of Aspects 44-50, wherein the linked pair of CSI-RSs are associated with a same scrambling identifier.

Aspect 52: The method of any of Aspects 44-51, wherein the linked pair of CSI-RSs are associated with a same power offset.

Aspect 53: The method of any of Aspects 44-52, wherein the linked pair of CSI-RSs are associated with a same resource block density.

Aspect 54: The method of any of Aspects 44-53, wherein the first downlink sub-band does not overlap with the second downlink sub-band.

Aspect 55: The method of any of Aspects 44-54, wherein the linked pair of CSI-RSs are both associated with a same time domain configuration.

Aspect 56: The method of any of Aspects 44-55, further comprising: receiving a medium access control (MAC) control element (MAC-CE) indicating an update to the linked pair of CSI-RSs.

Aspect 57: The method of any of Aspects 44-56, further comprising: skipping a measurement of the second CSI-RS in the second CSI-RS resource in connection with the first CSI-RS in the first CSI-RS resource being dropped.

Aspect 58: The method of any of Aspects 44-56, further comprising: performing a measurement of the second CSI-RS in the second CSI-RS resource in connection with the first CSI-RS in the first CSI-RS resource being dropped.

Aspect 59: The method of Aspect 58, wherein performing the measurement of the second CSI-RS in the second CSI-RS resource comprises: performing the measurement of the second CSI-RS in the second CSI-RS resource in connection with the first CSI-RS in the first CSI-RS resource being dropped and in association with the linked pair of CSI-RS resources being periodic or semi-persistent CSI-RS resources.

Aspect 60: The method of any of Aspects 44-59, wherein the linked pair of CSI-RS resources are associated with different symbols or different slots.

Aspect 61: The method of Aspect 60, wherein a timing requirement associated with the CSI report is defined relative to a later-occurring one of the first CSI-RS resource or the second CSI-RS resource.

Aspect 62: The method of any of Aspects 60-61, wherein the CSI report is a periodic or semi-persistent CSI report, and wherein CSI processing units are allocated from a time of an occurrence of a later-occurring one of the first CSI-RS resource or the second CSI-RS resource.

Aspect 63: The method of any of Aspects 60-62, wherein the linked pair of CSI-RS resources are associated with different slots, wherein the CSI report is a periodic or semi-persistent CSI report, and wherein a CSI reference resource associated with the CSI report applies to the first CSI-RS resource and the second CSI-RS resource.

Aspect 64: A method of wireless communication performed at a network node, comprising: transmitting, to a user equipment (UE), a first channel state information (CSI) resource configuration indicating a first CSI reference signal (CSI-RS) resource and a second CSI resource configuration indicating a second CSI-RS resource; transmitting, to the UE, an indication of a linked pair of CSI-RS resources for one or more sub-band full duplex (SBFD) symbols, the linked pair of CSI-RS resources including the first CSI-RS resource and the second CSI-RS resource; transmitting, to the UE, a first CSI-RS in the first CSI-RS resource and a second CSI-RS in the second CSI-RS resource; and receiving, from the UE, a CSI report including at least one CSI metric associated with measurements of the first CSI-RS and the second CSI-RS.

Aspect 65: The method of Aspect 64, wherein transmitting the indication of the linked pair of CSI-RS resources comprises: transmitting a CSI report configuration associated with the CSI report, the CSI report configuration including the indication of the linked pair of CSI-RS resources.

Aspect 66: The method of Aspect 64, wherein the first CSI-RS resource and the second CSI-RS resource are aperiodic CSI-RS resources, and wherein transmitting the indication of the linked pair of CSI-RS resources comprises: transmitting downlink control information (DCI) triggering measurements of the first CSI-RS in the first CSI-RS resource and the second CSI-RS in the second CSI-RS resource, the DCI including the indication of the linked pair of CSI-RS resources.

Aspect 67: The method of Aspect 64, wherein the first CSI-RS resource and the second CSI-RS resource are semi-persistent CSI-RS resources, and wherein transmitting the indication of the linked pair of CSI-RS resources comprises: transmitting a medium access control (MAC) control element (MAC-CE) indicating activation of the first CSI-RS resource and the second CSI-RS resource, the MAC-CE including the indication of the linked pair of CSI-RS resources.

Aspect 68: The method of any of Aspects 64-67, wherein the first CSI-RS resource is configured on a first downlink sub-band and the second CSI-RS resource is configured on a second downlink sub-band.

Aspect 69: The method of any of Aspects 64-68, wherein the linked pair of CSI-RSs are associated with a same one or more symbols or a same slot location.

Aspect 70: The method of any of Aspects 64-69, wherein the linked pair of CSI-RSs are associated with a same CSI-RS port configuration.

Aspect 71: The method of any of Aspects 64-70, wherein the linked pair of CSI-RSs are associated with a same scrambling identifier.

Aspect 72: The method of any of Aspects 64-71, wherein the linked pair of CSI-RSs are associated with a same power offset.

Aspect 73: The method of any of Aspects 64-72, wherein the linked pair of CSI-RSs are associated with a same resource block density.

Aspect 74: The method of any of Aspects 64-73, wherein the first downlink sub-band does not overlap with the second downlink sub-band.

Aspect 75: The method of any of Aspects 64-74, wherein the linked pair of CSI-RSs are both associated with a same time domain configuration.

Aspect 76: The method of any of Aspects 64-75, further comprising: transmitting a medium access control (MAC) control element (MAC-CE) indicating an update to the linked pair of CSI-RSs.

Aspect 77: The method of any of Aspects 64-76, wherein the linked pair of CSI-RS resources are associated with different symbols or different slots.

Aspect 78: The method of Aspect 77, wherein a timing requirement associated with the CSI report is defined relative to a later-occurring one of the first CSI-RS resource or the second CSI-RS resource.

Aspect 79: The method of any of Aspects 77-78, wherein the CSI report is a periodic or semi-persistent CSI report, and wherein CSI processing units are allocated from a time of an occurrence of a later-occurring one of the first CSI-RS resource or the second CSI-RS resource.

Aspect 80: The method of any of Aspects 77-79, wherein the linked pair of CSI-RS resources are associated with different slots, wherein the CSI report is a periodic or semi-persistent CSI report, and wherein a CSI reference resource associated with the CSI report applies to the first CSI-RS resource and the second CSI-RS resource.

Aspect 81: An apparatus for wireless communication at a device, comprising a processor; memory coupled with the processor; and instructions stored in the memory and executable by the processor to cause the apparatus to perform the method of one or more of Aspects 1-80.

Aspect 82: A device for wireless communication, comprising a memory and one or more processors coupled to the memory, the one or more processors configured to perform the method of one or more of Aspects 1-80.

Aspect 83: An apparatus for wireless communication, comprising at least one means for performing the method of one or more of Aspects 1-80.

Aspect 84: A non-transitory computer-readable medium storing code for wireless communication, the code comprising instructions executable by a processor to perform the method of one or more of Aspects 1-80.

Aspect 85: A non-transitory computer-readable medium storing a set of instructions for wireless communication, the set of instructions comprising one or more instructions that, when executed by one or more processors of a device, cause the device to perform the method of one or more of Aspects 1-80.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. An apparatus for wireless communication at a user equipment (UE), comprising:
   one or more memories storing processor-executable code; and
   one or more processors coupled with the one or more memories, at least one processor of the one or more processors configured to cause the UE to:
   receive, from a network node, a channel state information (CSI) resource configuration indicating a linked pair of CSI reference signal (CSI-RS) resources for sub-band full duplex (SBFD) symbols, the linked pair of CSI-RS resources including a first CSI-RS resource on a first downlink sub-band and a second CSI-RS resource on a second downlink sub-band, wherein the linked pair of CSI-RS resources are associated with different symbols or different slots;
   receive, from the network node, a first CSI-RS in the first CSI-RS resource on the first downlink sub-band and a second CSI-RS in the second CSI-RS resource on the second downlink sub-band; and
   transmit, to the network node, a CSI report including at least one CSI metric associated with measurements of the first CSI-RS and the second CSI-RS.

2. The apparatus of claim 1, wherein the CSI resource configuration indicates a first CSI-RS resource set including the first CSI-RS resource and a second CSI-RS resource set including the second CSI-RS resource.

3. The apparatus of claim 2, wherein the CSI resource configuration includes an indication of SBFD operation, and wherein the CSI resource configuration indicates the first CSI-RS resource set and the second CSI-RS resource set in association with the CSI resource configuration including the indication of SBFD operation.

4. The apparatus of claim 1, wherein the CSI resource configuration indicates a CSI-RS resource set that includes a linked pairing indication that indicates the linked pair of CSI-RS resources for SBFD symbols.

5. The apparatus of claim 1, wherein the CSI resource configuration indicates a CSI-RS resource set including an indication of a primary CSI-RS resource associated with the CSI report and an indication of a secondary CSI-RS resource linked to the primary CSI-RS resource, and wherein the primary CSI-RS resource is the first CSI-RS resource and the secondary CSI-RS resource is the second CSI-RS resource.

6. The apparatus of claim 5, wherein the indication of the secondary CSI-RS resource includes a flag indicating that the secondary CSI-RS resource is linked to the primary CSI-RS resource and an identifier associated with the primary CSI-RS resource.

7. The apparatus of claim 1, wherein the linked pair of CSI-RSs are associated with at least one of:
    a same one or more symbols or a same slot location,
    a same CSI-RS port configuration,
    a same scrambling identifier,
    a same power offset, or
    a same resource block density.

8. The apparatus of claim 1, wherein at least one processor of the one or more processors is configured to cause the UE to:
    receive a medium access control (MAC) control element (MAC-CE) indicating an update to the linked pair of CSI-RS resources.

9. The apparatus of claim 1, wherein the CSI resource configuration indicates a plurality of linked pairs of CSI-RS resources including the linked pair of CSI-RS resources, and wherein the linked pair of CSI-RS resources can be activated from among the plurality of linked pairs of CSI-RS resources by a medium access control (MAC) control element (MAC-CE) received at the UE.

10. The apparatus of claim 1, wherein at least one processor of the one or more processors is configured to cause the UE to:
    skip a measurement of the second CSI-RS in the second CSI-RS resource in connection with the first CSI-RS in the first CSI-RS resource being dropped.

11. The apparatus of claim 1, wherein at least one processor of the one or more processors is configured to cause the UE to:
    perform a measurement of the second CSI-RS in the second CSI-RS resource in connection with the first CSI-RS in the first CSI-RS resource being dropped.

12. The apparatus of claim 1, wherein a timing requirement associated with the CSI report is defined relative to a later-occurring one of the first CSI-RS resource or the second CSI-RS resource.

13. The apparatus of claim 1, wherein the CSI report is a periodic or semi-persistent CSI report, and wherein CSI processing units are allocated from a time of an occurrence of a later-occurring one of the first CSI-RS resource or the second CSI-RS resource.

14. The apparatus of claim 1, wherein the linked pair of CSI-RS resources are associated with different slots, wherein the CSI report is a periodic or semi-persistent CSI report, and wherein a CSI reference resource associated with the CSI report applies to the first CSI-RS resource and the second CSI-RS resource.

15. An apparatus for wireless communication at a network node, comprising:
    one or more memories storing processor-executable code; and
    one or more processors coupled with the one or more memories, at least one processor of the one or more processors configured to cause the network node to:
    transmit, to a user equipment (UE), a channel state information (CSI) resource configuration indicating a linked pair of CSI reference signal (CSI-RS) resources for sub-band full duplex (SBFD) symbols, the linked pair of CSI-RS resources including a first CSI-RS resource on a first downlink sub-band and a second CSI-RS resource on a second downlink sub-band, wherein the linked pair of CSI-RS resources are associated with different symbols or different slots;
    transmit, to the UE, a first CSI-RS in the first CSI-RS resource on the first downlink sub-band and a second CSI-RS in the second CSI-RS resource on the second downlink sub-band; and
    receive, from the UE, a CSI report including at least one CSI metric associated with measurements of the first CSI-RS and the second CSI-RS.

16. The apparatus of claim 15, wherein the CSI resource configuration indicates a first CSI-RS resource set including the first CSI-RS resource and a second CSI-RS resource set including the second CSI-RS resource.

17. The apparatus of claim 16, wherein the CSI resource configuration includes an indication of SBFD operation, and wherein the CSI resource configuration indicates the first CSI-RS resource set and the second CSI-RS resource set in association with the CSI resource configuration including the indication of SBFD operation.

18. The apparatus of claim 15, wherein the CSI resource configuration indicates a CSI-RS resource set that includes a linked pairing indication that indicates the linked pair of CSI-RS resources for SBFD symbols.

19. The apparatus of claim 15, wherein the CSI resource configuration indicates a CSI-RS resource set including an indication of a primary CSI-RS resource associated with the CSI report and an indication of a secondary CSI-RS resource linked to the primary CSI-RS resource, and wherein the primary CSI-RS resource is the first CSI-RS resource and the secondary CSI-RS resource is the second CSI-RS resource.

20. The apparatus of claim 19, wherein the indication of the secondary CSI-RS resource includes a flag indicating that the secondary CSI-RS resource is linked to the primary CSI-RS resource and an identifier associated with the primary CSI-RS.

21. The apparatus of claim 15, wherein the linked pair of CSI-RSs are associated with at least one of:
    a same one or more symbols or a same slot location,
    a same CSI-RS port configuration,
    a same scrambling identifier,
    a same power offset, or
    a same resource block density.

22. A method of wireless communication performed at a user equipment (UE), comprising:
    receiving, from a network node, a channel state information (CSI) resource configuration indicating a linked pair of CSI reference signal (CSI-RS) resources for sub-band full duplex (SBFD) symbols, the linked pair of CSI-RS resources including a first CSI-RS resource on a first downlink sub-band and a second CSI-RS resource on a second downlink sub-band, wherein the linked pair of CSI-RS resources are associated with different symbols or different slots;

receiving, from the network node, a first CSI-RS in the first CSI-RS resource on the first downlink sub-band and a second CSI-RS in the second CSI-RS resource on the second downlink sub-band; and transmitting, to the network node, a CSI report including at least one CSI metric associated with measurements of the first CSI-RS and the second CSI-RS.

23. The method of claim 22, wherein the CSI resource configuration indicates a first CSI-RS resource set including the first CSI-RS resource and a second CSI-RS resource set including the second CSI-RS resource.

24. The method of claim 23, wherein the CSI resource configuration includes an indication of SBFD operation, and wherein the CSI resource configuration indicates the first CSI-RS resource set and the second CSI-RS resource set in association with the CSI resource configuration including the indication of SBFD operation.

25. The method of claim 22, wherein the CSI resource configuration indicates a CSI-RS resource set that includes a linked pairing indication that indicates the linked pair of CSI-RS resources for SBFD symbols.

26. The method of claim 22, wherein the CSI resource configuration indicates a CSI-RS resource set including an indication of a primary CSI-RS resource associated with the CSI report and an indication of a secondary CSI-RS resource linked to the primary CSI-RS resource, and wherein the primary CSI-RS resource is the first CSI-RS resource and the secondary CSI-RS resource is the second CSI-RS resource.

27. A method of wireless communication performed at a network node, comprising:

transmitting, to a user equipment (UE), a channel state information (CSI) resource configuration indicating a linked pair of CSI reference signal (CSI-RS) resources for sub-band full duplex (SBFD) symbols, the linked pair of CSI-RS resources including a first CSI-RS resource on a first downlink sub-band and a second CSI-RS resource on a second downlink sub-band, wherein the linked pair of CSI-RS resources are associated with different symbols or different slots;

transmitting, to the UE, a first CSI-RS in the first CSI-RS resource on the first downlink sub-band and a second CSI-RS in the second CSI-RS resource on the second downlink sub-band; and receiving, from the UE, a CSI report including at least one CSI metric associated with measurements of the first CSI-RS and the second CSI-RS.

28. The method of claim 27, wherein the CSI resource configuration indicates a first CSI-RS resource set including the first CSI-RS resource and a second CSI-RS resource set including the second CSI-RS resource.

29. The method of claim 28, wherein the CSI resource configuration includes an indication of SBFD operation, and wherein the CSI resource configuration indicates the first CSI-RS resource set and the second CSI-RS resource set in association with the CSI resource configuration including the indication of SBFD operation.

\* \* \* \* \*